United States Patent
Jung et al.

(10) Patent No.: US 11,889,516 B2
(45) Date of Patent: Jan. 30, 2024

(54) METHOD AND APPARATUS FOR TRANSMITTING OR RECEIVING FEEDBACK INFORMATION IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Heung Mook Kim, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 401 days.

(21) Appl. No.: 17/299,241

(22) PCT Filed: Jan. 2, 2020

(86) PCT No.: PCT/KR2020/000020
§ 371 (c)(1),
(2) Date: Jun. 2, 2021

(87) PCT Pub. No.: WO2020/145567
PCT Pub. Date: Jul. 16, 2020

(65) Prior Publication Data
US 2022/0061081 A1    Feb. 24, 2022

(30) Foreign Application Priority Data

Jan. 11, 2019  (KR) .................. 10-2019-0004061
Apr. 11, 2019  (KR) .................. 10-2019-0042533
(Continued)

(51) Int. Cl.
*H04W 72/23*   (2023.01)
*H04L 1/1812*  (2023.01)

(52) U.S. Cl.
CPC .......... *H04W 72/23* (2023.01); *H04L 1/1812* (2013.01)

(58) Field of Classification Search
None
See application file for complete search history.

(56) References Cited

U.S. PATENT DOCUMENTS 10,110,428 B2    10/2018   Um et al.
2017/0208584 A1  7/2017    Qu et al.
(Continued)

OTHER PUBLICATIONS

3GPP TS 38.213 V15.3.0, 3rd Generation Partnership Project; Technical Specification Group Radio Access Network; NR; Physical layer procedures for control (Release 15), pp. 1-101, Sep. 2018.
(Continued)

*Primary Examiner* — Alex Skripnikov
(74) *Attorney, Agent, or Firm* — Rabin & Berdo, P.C.

(57) ABSTRACT

Disclosed are a method and an apparatus for transmitting or receiving feedback information in a communication system. An operation method of a terminal comprises the steps of: receiving, from a base station, DCI #1 including scheduling information of PDSCH #1 and transmission resource information of HARQ response #1 with respect to PDSCH #1; receiving, from the base station, DCI #2 including scheduling information of PDSCH #2 and transmission resource information of HARQ response #2 with respect to PDSCH #2; and when the transmission resource information of HARQ response #1 is configured as undefined, transmitting, to the base station, HARQ response #1 and HARQ response #2 by using a resource indicated by the transmission resource information of HARQ response #2. Therefore, the performance of the communication system can be improved.

20 Claims, 8 Drawing Sheets

(30) Foreign Application Priority Data

Jul. 30, 2019 (KR) ........................ 10-2019-0092309
Sep. 20, 2019 (KR) ........................ 10-2019-0116088

(56) References Cited

U.S. PATENT DOCUMENTS

| | | |
|---|---|---|
| 2018/0278380 A1 | 9/2018 | Kim et al. |
| 2018/0359750 A1 | 12/2018 | Wei et al. |
| 2019/0037561 A1 | 1/2019 | Jung et al. |
| 2019/0074935 A1 | 3/2019 | Babaei et al. |
| 2019/0089499 A1 | 3/2019 | Nam et al. |
| 2019/0103947 A1 | 4/2019 | Park |
| 2019/0165897 A1* | 5/2019 | Lin ..................... H04L 1/1854 |
| 2020/0374909 A1* | 11/2020 | Takeda ................ H04W 72/535 |
| 2021/0006377 A1* | 1/2021 | Hooli ................... H04L 1/1864 |

OTHER PUBLICATIONS

Catt, "On PHY enhancements for Rel-16 URLLC", R1-1810551, 3GPP TSG RAN WG1 #94b, Chengdu, China, Sep. 29, 2018.
Oppo, "Offline summary on UCI enhancements for URLLC", R1-1814273, 3GPP TSG RAN WG1 #95, Spokane, USA, Nov. 19, 2018.
Samsung, "CBG-Based DL/UL Retransmissions", R1-1717664, 3GPP TSG RAN WG1 #90b, Prague, CZ, Oct. 3, 2017.
Vivo, "Discussion on HARQ operation for NR-U", R1-1812302, 3GPP TSG RAN WG1 #95, Spokane, USA, Nov. 3, 2018.

* cited by examiner

METHOD AND APPARATUS FOR TRANSMITTING OR RECEIVING FEEDBACK INFORMATION IN COMMUNICATION SYSTEM

TECHNICAL FIELD

The present invention relates to techniques for transmitting and receiving feedback information, and more particularly, to techniques for transmitting and receiving a hybrid automatic repeat request (HARQ) response for data in a communication system.

BACKGROUND ART

With the development of information and communication technology, various wireless communication technologies are being developed. Typical wireless communication technologies include long term evolution (LTE), new radio (NR), etc. defined in the 3$^{rd}$ generation partnership project (3GPP) standard. The LTE may be one of fourth generation (4G) wireless communication technologies, and the NR may be one of fifth generation (5G) wireless communication technologies.

The 5G communication system (hereinafter, a NR communication system) using a higher frequency band (e.g., a frequency band of 6 GHz or higher) than a frequency band (e.g., a frequency band lower below 6 GHz) of the 4G communication system is being considered for processing of soaring wireless data after commercialization of the 4G communication system (e.g., communication system supporting the LTE). The 5G communication system may support enhanced Mobile BroadBand (eMBB), Ultra Reliable Low Latency Communication (URLLC), massive Machine Type Communication (mMTC), and the like. The 5G communication system may have a flexible structure to support the eMBB, the URLLC, and mMTC.

The 5G communication system may operate in an unlicensed band as well as in a licensed band. In the unlicensed band, the 5G communication system may support discontinuous use of resources. For example, a base station may transmit a signal to a terminal using resources (e.g., non-contiguous resources) in the unlicensed band. In this case, the terminal should be able to transmit feedback information (e.g., hybrid automatic repeat request (HARQ) response) for the signal to the base station in the unlicensed band. At this time, there is a need for a method for the base station to normally receive the feedback information from the terminal in the unlicensed band.

Meanwhile, the above-described technologies are described to enhance the understanding of the background of the present disclosure, and they may include non-prior arts that are not already known to those of ordinary skill in the art.

DISCLOSURE

Technical Problem

The present invention is directed to providing a method and an apparatus for transmitting and receiving feedback information in a communication system.

Technical Solution

An operation method of a terminal in a communication system, according to a first exemplary embodiment of the present invention for achieving the above-described objective, may comprise receiving downlink control information (DCI) #1 from a base station, the DCI #1 including scheduling information of a physical downlink shared channel (PDSCH) #1 and transmission resource information of a hybrid automatic repeat request (HARQ) response #1 for the PDSCH #1; receiving the PDSCH #1 from the base station based on the scheduling information included in the DCI #1; receiving DCI #2 from the base station, the DCI #2 including scheduling information of a PDSCH #2 and transmission resource information of an HARQ response #2 for the PDSCH #2; receiving the PDSCH #2 from the base station based on the scheduling information included in the DCI #2; and when the transmission resource information of the HARQ response #1 is configured as undefined, transmitting the HARQ response #1 and the HARQ response #2 to the base station by using a resource indicated by the transmission resource information of the HARQ response #2.

The DCI #1 may further include a PDSCH group index indicating a PDSCH group to which the PDSCH #1 belongs, the DCI #2 may further include a PDSCH group index indicating a PDSCH group to which the PDSCH #2 belongs, and when the transmission resource information of the HARQ response #1 is configured as undefined and the PDSCH #1 and the PDSCH #2 belong to a same PDSCH group, the HARQ response #1 and the HARQ response #2 may be transmitted by using the resource indicated by the transmission resource information of the HARQ response #2.

The DCI #1 may further include a PDSCH group index indicating a PDSCH group to which the PDSCH #1 belongs, the DCI #2 may further include a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 and the HARQ response #2 may be transmitted by using the resource indicated by the transmission resource information of the HARQ response #2.

The HARQ response #1 and the HARQ response #2 may be transmitted in form of an HARQ codebook, and the HARQ codebook may be configured according to an order of the PDSCH group indexes respectively associated with the HARQ response #1 and the HARQ response #2.

The DCI #1 may further include a PDSCH group index indicating a PDSCH group to which the PDSCH #1 belongs, the DCI #2 may further include a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 may be not transmitted by using the resource indicated by the transmission resource information of the HARQ response #2, and the HARQ response #2 may be transmitted by using the resource indicated by the transmission resource information of the HARQ response #2.

The DCI #1 may further include a PDSCH group index indicating a PDSCH group #1 to which the PDSCH #1 belongs, and the DCI #2 may further include a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2. When the group indicator is set to a first value, the HARQ response #2 for the PDSCH #2 belonging to the PDSCH group #2 may be transmitted in the resource indicated by the transmission resource information of the HARQ response #2, and when the group indicator is set to a second value, the HARQ response #1 for the PDSCH #1 belonging to the PDSCH group #1 and the HARQ response #2 for the PDSCH #2 belonging to the PDSCH group #2 may be transmitted by using the resource indicated by the transmission resource information of the HARQ response #2.

The DCI #1 may further include a PDSCH group index indicating a PDSCH group #1 to which the PDSCH #1 belongs, and the DCI #2 may further include a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2. When the group indicator is set to a first value, the HARQ response #2 for the PDSCH #2 belonging to the PDSCH group #2 may be transmitted in the resource indicated by the transmission resource information of the HARQ response #2, and when the group indicator is set to a second value, HARQ responses for PDSCHs belonging to all PDSCH groups may be transmitted by using the resource indicated by the transmission resource information of the HARQ response #2.

The operation method may further comprise receiving a radio resource message (RRC) message including information indicating HARQ candidate transmission resources from the base station before receiving the DCI #1, wherein the transmission resource information of each of the HARQ response #1 and the HARQ response #2 may indicate one HARQ candidate transmission resource among the HARQ candidate transmission resources.

The RRC message may further include information indicating whether to perform a detection operation of one or more DCIs including the PDSCH group index.

The RRC message may further include information indicating a number of PDSCH groups.

The HARQ response #1 and the HARQ response #2 may be transmitted through a physical uplink control channel (PUCCH) or a physical uplink shared channel (PUSCH) indicated by the transmission resource information of the HARQ response #2.

An operation method of a base station in a communication system, according to a second exemplary embodiment of the present invention for achieving the above-described objective, may comprise transmitting downlink control information (DCI) #1 to a terminal, the DCI #1 including scheduling information of a physical downlink shared channel (PDSCH) #1 and transmission resource information of a hybrid automatic repeat request (HARQ) response #1 for the PDSCH #1; transmitting the PDSCH #1 to the terminal based on the scheduling information included in the DCI #1; transmitting DCI #2 to the terminal, the DCI #2 including scheduling information of a PDSCH #2 and transmission resource information of an HARQ response #2 for the PDSCH #2; transmitting the PDSCH #2 to the terminal based on the scheduling information included in the DCI #2; and when the transmission resource information of the HARQ response #1 is configured as undefined, receiving the HARQ response #1 and the HARQ response #2 from the terminal by using a resource indicated by the transmission resource information of the HARQ response #2.

The DCI #1 may further include a PDSCH group index indicating a PDSCH group to which the PDSCH #1 belongs, the DCI #2 may further include a PDSCH group index indicating a PDSCH group to which the PDSCH #2 belongs, and when the transmission resource information of the HARQ response #1 is configured as undefined and the PDSCH #1 and the PDSCH #2 belong to a same PDSCH group, the HARQ response #1 and the HARQ response #2 may be received by using the resource indicated by the transmission resource information of the HARQ response #2.

The DCI #1 may further include a PDSCH group index indicating a PDSCH group to which the PDSCH #1 belongs, the DCI #2 may further include a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 and the HARQ response #2 may be received by using the resource indicated by the transmission resource information of the HARQ response #2.

The HARQ response #1 and the HARQ response #2 may be received in form of an HARQ codebook, and the HARQ codebook may be configured according to an order of the PDSCH group indexes respectively associated with the HARQ response #1 and the HARQ response #2.

The DCI #1 may further include a PDSCH group index indicating a PDSCH group to which the PDSCH #1 belongs, the DCI #2 may further include a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 may be not received by using the resource indicated by the transmission resource information of the HARQ response #2, and the HARQ response #2 may be received by using the resource indicated by the transmission resource information of the HARQ response #2.

The DCI #1 may further include a PDSCH group index indicating a PDSCH group #1 to which the PDSCH #1 belongs, and the DCI #2 may further include a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2. When the group indicator is set to a first value, the HARQ response #2 for the PDSCH #2 belonging to the PDSCH group #2 may be received in the resource indicated by the transmission resource information of the HARQ response #2, and when the group indicator is set to a second value, the HARQ response #1 for the PDSCH #1 belonging to the PDSCH group #1 and the HARQ response #2 for the PDSCH #2 belonging to the PDSCH group #2 may be received by using the resource indicated by the transmission resource information of the HARQ response #2.

The DCI #1 may further include a PDSCH group index indicating a PDSCH group #1 to which the PDSCH #1 belongs, and the DCI #2 may further include a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2. When the group indicator is set to a first value, the HARQ response #2 for the PDSCH #2 belonging to the PDSCH group #2 may be received in the resource indicated by the transmission resource information of the HARQ response #2, and when the group indicator is set to a second value, HARQ responses for PDSCHs belonging to all PDSCH groups may be received by using the resource indicated by the transmission resource information of the HARQ response #2.

The operation method may further comprise transmitting a radio resource message (RRC) message including information indicating HARQ candidate transmission resources to the terminal before transmitting the DCI #1, wherein the transmission resource information of each of the HARQ response #1 and the HARQ response #2 indicates one HARQ candidate transmission resource among the HARQ candidate transmission resources.

The RRC message may further include information indicating whether to perform a detection operation of one or more DCIs including the PDSCH group index and information indicating a number of PDSCH groups.

Advantageous Effects

According to the present invention, downlink control information (DCI) #1 scheduling a physical downlink shared channel (PDSCH) #1 may include information on a transmission resource of a hybrid automatic repeat request (HARQ) response #1 for the PDSCH #1. When the information on the transmission resource of the HARQ response #1 is configured as undefined, the terminal may use a resource indicated by information on a transmission resource of an HARQ response #2 for a PDSCH #2, which is included in a DCI #2 received after the DCI #1, to transmit the HARQ response #1 and the HARQ response #2 to the base station. Therefore, transmission of the HARQ response can be guaranteed in the unlicensed band, and the undefined HARQ response (e.g., HARQ response #1) can be transmitted to the base station without a separate signaling procedure. Thus, the performance of the communication system can be improved.

MODES OF THE INVENTION

Figure 1:
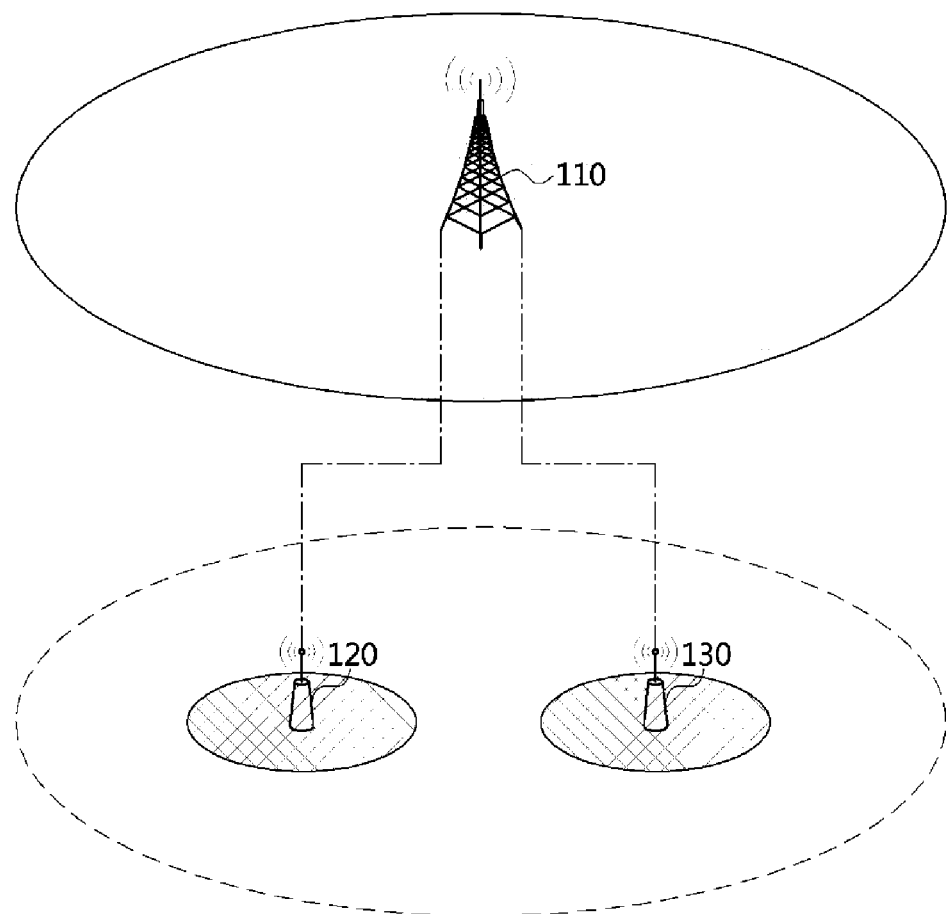
FIG. 1 is a conceptual diagram illustrating a first exemplary embodiment of a wireless communication network.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A wireless communication network to which exemplary embodiments according to the present disclosure will be described. However, the wireless communication network to which exemplary embodiments according to the present disclosure are applied are not restricted to what will be described below. That is, the exemplary embodiments according to the present disclosure may be applied to various wireless communication networks. Here, the term 'wireless communication network' may be used with the same meaning as the term 'wireless communication system'.

FIG. 1 is a conceptual diagram illustrating a first exemplary embodiment of a wireless communication network.

Referring to FIG. 1, a first base station 110 may support a cellular communication (e.g., long term evolution (LTE), LTE-advance (LTE-A), LTA-A Pro, LTE-unlicensed (LTE-U), new radio (NR), and NR-unlicensed (NR-U) specified in the $3^{rd}$ generation partnership project (3GPP)), or the like. The first base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like.

The first base station 110 may operate in a frequency band F1 and may form a macro cell. The first base station 110 may be connected to another base station (e.g., second base station 120, third base station 130, etc.) through an ideal backhaul or a non-ideal backhaul. The second base station 120 may be located within the coverage of the first base station 110. The second base station 120 may operate in a frequency band F2 and may form a small cell. The communication scheme (e.g., NR) supported by the second base station 120 may be different from the communication scheme of the first base station 110.

The third base station 130 may be located within the coverage of the first base station 110. The third base station 130 may operate in the frequency band F2 and may form a small cell. The communication scheme (e.g., NR) supported by the third base station 120 may be different from the communication scheme of the first base station 110. Each of the first base station 110 and a user equipment (UE)(not shown) connected to the first base station 110 may transmit and receive signals through a carrier aggregation (CA) between the frequency band F1 and the frequency band F2. Alternatively, each of the UE connected to the first base station 110 and the first base station 110 may support dual-connectivity (DC) for the frequency band F1 and the frequency band F2, and may transmit and receive signals in the DC environment.

The communication node (i.e., base station, UE, etc.) constituting the wireless communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, an evolved Node B, a 5G Node B (gNodeB), a base transceiver station (BTS), a radio base station, a radio transceiver, an access point, an access node, a transmission/reception point (Tx/Rx Point), or the like. Among the communication nodes, the UE may be referred to as a terminal, an access terminal, a mobile terminal, a station, a subscriber station, a portable subscriber station, a mobile station, a node, a device, or the like. The communication node may have the following structure.

Figure 2:
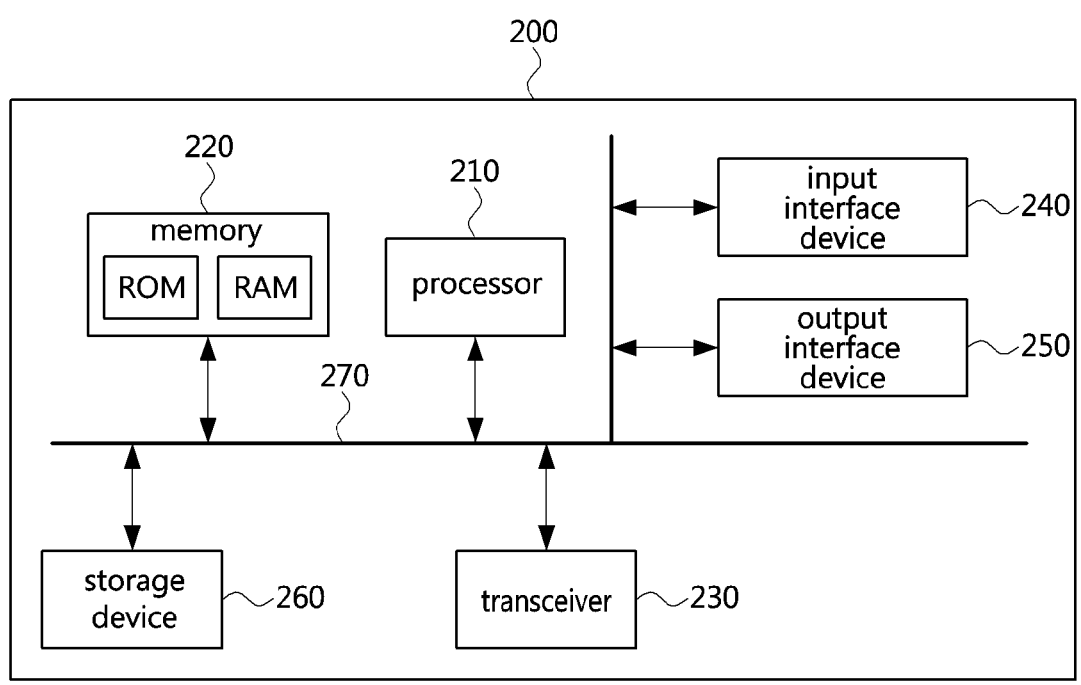
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, operation methods of a communication node in a wireless communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE is described, a corresponding base station may perform an operation corresponding to the operation of the UE. Conversely, when an operation of the base station is described, the corresponding UE may perform an operation corresponding to the operation of the base station.

Figure 3:
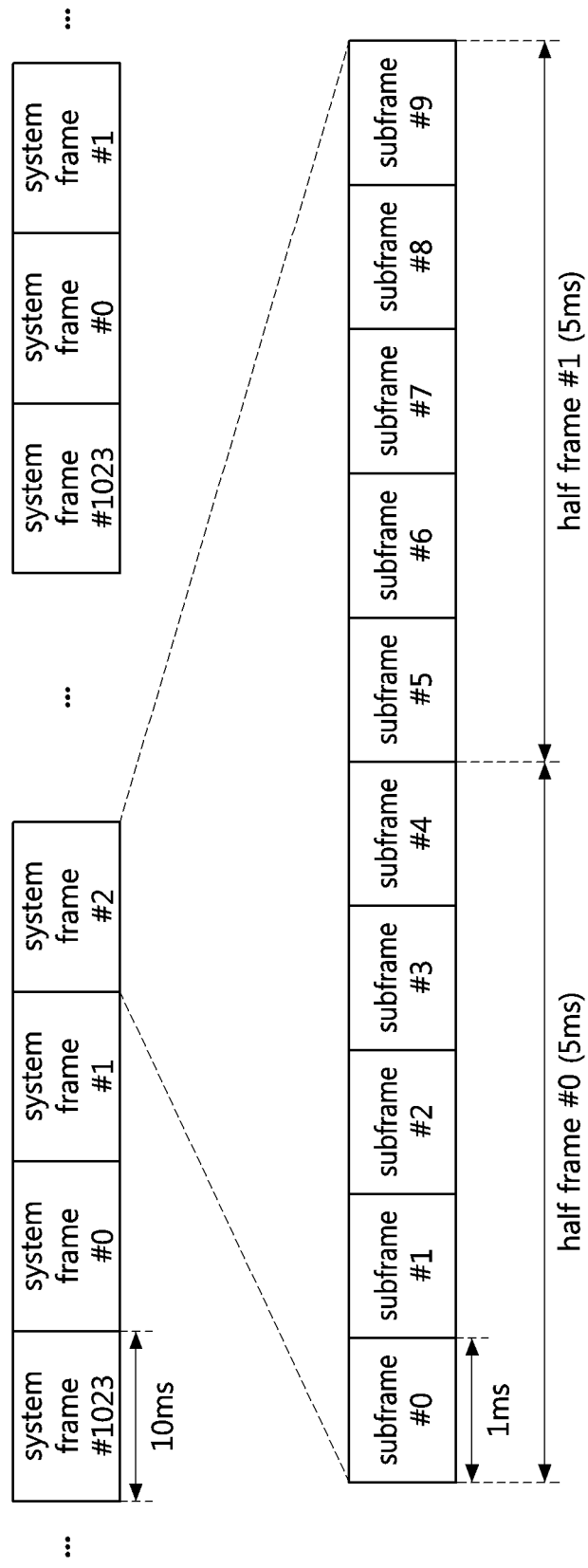
FIG. 3 is a conceptual diagram illustrating a first exemplary embodiment of a system frame in a wireless communication network.

FIG. 3 is a conceptual diagram illustrating a first exemplary embodiment of a system frame in a wireless communication network.

Referring to FIG. 3, time resources in a wireless communication network may be divided into frames. For example, system frames each of which has a length of 10 milliseconds (ms) may be configured consecutively in the time axis of the wireless communication network. System frame numbers (SFNs) may set to #0 to #1023. In this case, 1024 system frames may be repeated in the time axis of the wireless communication network. For example, an SFN of a system frame after the system frame #1023 may be set to #0.

One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
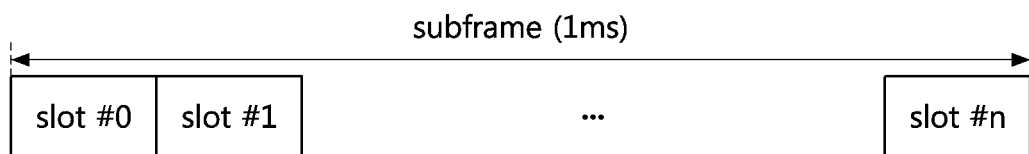
FIG. 4 is a conceptual diagram illustrating a first exemplary embodiment of a subframe in a wireless communication network.

FIG. 4 is a conceptual diagram illustrating a first exemplary embodiment of a subframe in a wireless communication network.

Referring to FIG. 4, one subframe may include n slots, and n may be an integer of 1 or more. Accordingly, one subframe may be composed of one or more slots.

Figure 5:
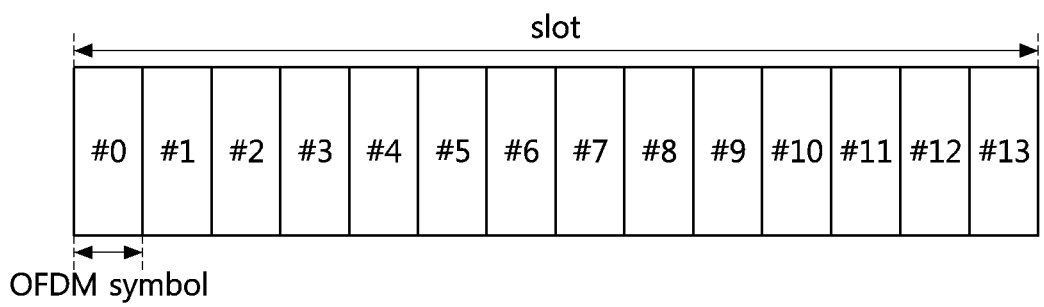
FIG. 5 is a conceptual diagram illustrating a first exemplary embodiment of a slot in a wireless communication network.
Figure 6:
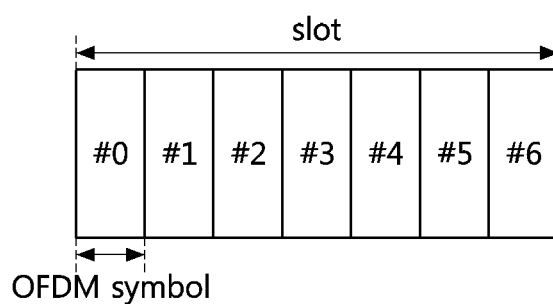
FIG. 6 is a conceptual diagram illustrating a second exemplary embodiment of a slot in a wireless communication network.

FIG. 5 is a conceptual diagram illustrating a first exemplary embodiment of a slot in a wireless communication network, and FIG. 6 is a conceptual diagram illustrating a second exemplary embodiment of a slot in a wireless communication network.

Referring to FIG. 5 and FIG. 6, one slot may comprise one or more OFDM symbols. For example, one slot shown in FIG. 5 may be composed of 14 OFDM symbols. One slot shown in FIG. 6 may be composed of 7 OFDM symbols. Here, the length of the slot may vary depending on the number of OFDM symbols included in the slot and the length of the OFDM symbol. Alternatively, the length the slot may vary according to a numerology. When a subcarrier spacing is 15 kHz (e.g., μ=0), the length of the slot may be 1 ms. In this case, one system frame may include 10 slots. When the subcarrier spacing is 30 kHz (e.g., μ=1), the length of the slot length may be 0.5 ms. In this case, one system frame may include 20 slots.

When the subcarrier spacing is 60 kHz (e.g., μ=2), the length of the slot length may be 0.25 ms. In this case, one system frame may include 40 slots. When the subcarrier spacing is 120 kHz (e.g., μ=3), the length of the slot length may be 0.125 ms. In this case, one system frame may include 80 slots. When the subcarrier spacing is 240 kHz (e.g., μ=4), the length of the slot length may be 0.0625 ms. In this case, one system frame may include 160 slots.

The symbol may be configured as a downlink (DL) symbol, a flexible symbol, or an uplink (UL) symbol. A slot composed only of DL symbols may be referred to as 'DL slot', a slot composed only of FL symbols may be referred to as 'FL slots', and a slot composed only of UL symbols may be referred to as 'UL slot'.

Figure 7:
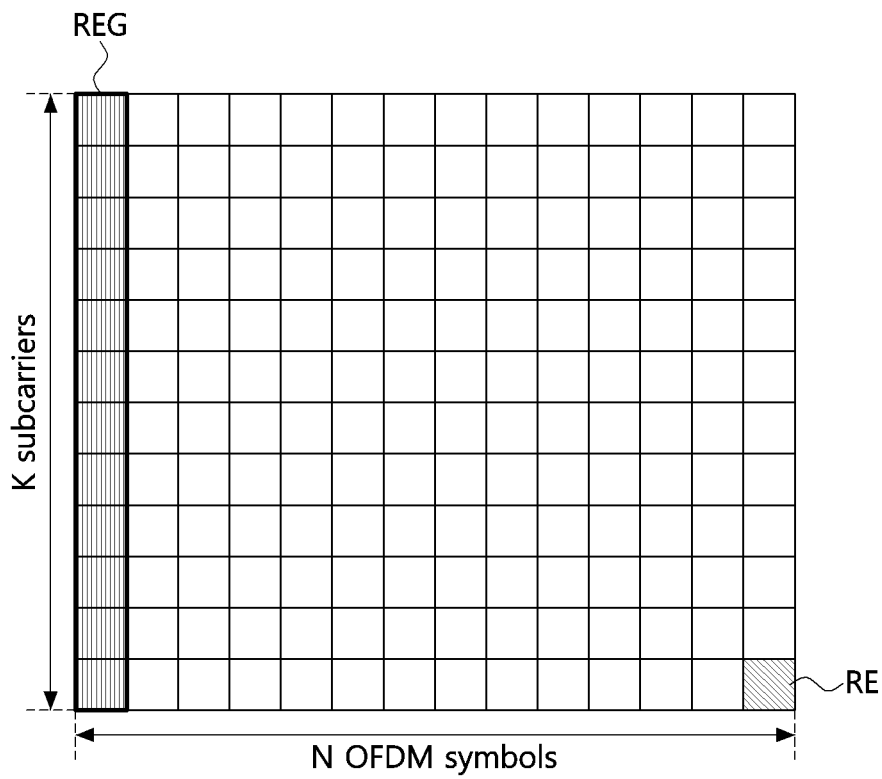
FIG. 7 is a conceptual diagram illustrating a first exemplary embodiment of time-frequency resources in a wireless communication network.

FIG. 7 is a conceptual diagram illustrating a first exemplary embodiment of time-frequency resources in a wireless communication network.

Referring to FIG. 7, a resource configured with one OFDM symbol in the time axis and one subcarrier in the frequency axis may be defined as a 'resource element (RE)'. Resources configured with one OFDM symbol in the time axis and K subcarriers in the frequency axis may be defined as a 'resource element group (REG)'. One REG may include K REs. The REG may be used as a basic unit of resource allocation in the frequency axis. K may be a natural number. Here, K may be 12. N may be a natural number. N in the slot shown in FIG. 5 may be 14, and N in the slot shown in FIG. 6 may be 7. The N OFDM symbols may be used as a basic unit of resource allocation in the time axis.

Figure 8:
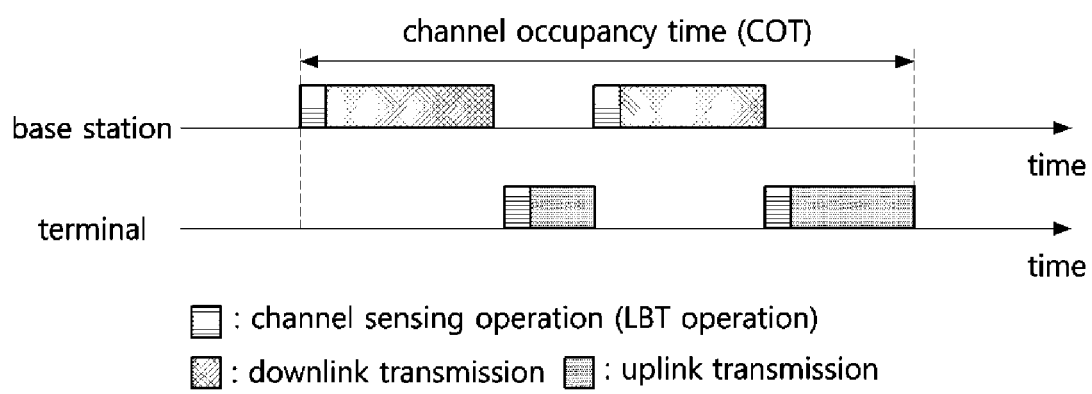
FIG. 8 is a timing diagram illustrating a first exemplary embodiment of a channel sensing method in a wireless communication network.

FIG. 8 is a timing diagram illustrating a first exemplary embodiment of a channel sensing method in a wireless communication network.

Referring to FIG. 8, each of the base station and the terminal may perform a channel sensing operation to transmit a signal and/or a channel. Here, the signal may be a reference signal, and the reference signal may be a channel state information-reference signal (CSI-RS), a sounding reference signal (SRS), a demodulation-reference signal (DM-RS), a phase tracking-reference signal (PT-RS), or the like.

The channel may be a physical downlink control channel (PDCCH), a physical downlink shared channel (PDSCH), a physical uplink control channel (PUCCH), a physical uplink shared channel (PUSCH), a physical sidelink control channel (PSCCH), a physical sidelink shared channel (PSSCH), or the like. In the following exemplary embodiments, the control channel may refer to PDCCH, PUCCH, or PSCCH, and the data channel may refer to PDSCH, PUSCH, or PSSCH.

Each of the base station and the terminal may identify whether there is a signal transmitted from another communication node by performing the channel sensing operation. For example, when a signal transmitted by another communication node is detected, each of the base station and the terminal may not transmit a signal and/or a channel. When a signal transmitted by another communication node is not detected, each of the base station and the terminal may transmit a signal and/or a channel. The channel sensing operation may be performed before transmission of a signal and/or a channel. The channel sensing operation may be referred to as a 'listen before talk (LBT) operation'.

The base station may perform an LBT operation to transmit a downlink signal and/or a downlink channel, and when a channel is determined to be in idle state as a result of performing the LBT operation, a channel occupancy time (COT) may be secured in the corresponding channel. In case that the COT is secured, the base station may perform downlink transmission within the COT. When the downlink communication procedure is completed, the terminal may perform an LBT operation to transmit an uplink signal and/or an uplink channel. The terminal may perform uplink transmission within the COT when the channel is determined to be in idle state as a result of performing the LBT operation. Alternatively, the terminal may perform uplink transmission without performing the LBT operation within the COT.

When the uplink communication procedure is completed, the base station may perform an LBT operation to transmit a downlink signal and/or a downlink channel. The LBT operation in this case may be different from the LBT operation performed to secure the COT. For example, a scheme and/or execution time of the LBT operation may be different. The base station may perform downlink transmission within the COT when the channel is determined to be in idle state as a result of performing the LBT operation. The LBT operation may be performed differently according to categories defined in Table 1 below.

TABLE 1

| | Operation scheme |
|---|---|
| LBT category 1 | No LBT |
| LBT category 2 | Perform LBT operation within a preconfigured interval (random backoff operation X) |
| LBT category 3 | Perform LBT operation within an interval corresponding to a backoff counter randomly selected within a contention window of a fixed size |
| LBT category 4 | Perform LBT operation within an interval corresponding to a backoff counter randomly selected within a contention window of a variable size |

According to the exemplary embodiments described above, each of the base station and the terminal may secure a COT by performing the LBT operation, and downlink and uplink communications may be performed within the corresponding COT.

Hereinafter, downlink communication methods and feedback information transmission methods in downlink communication will be described. The base station may transmit a data channel to the terminal, and the terminal may transmit to the base station feedback information (e.g., hybrid automatic repeat request (HARQ) response) indicating whether the data channel is received. The HARQ response may be an acknowledgment (ACK) or a negative ACK (NACK). When downlink data is successfully received, the terminal may transmit an ACK to the base station as an HARQ response for the downlink data. Upon receiving the ACK from the terminal, the base station may perform a procedure for transmitting new downlink data. On the other hand, when the downlink data is not successfully received, the terminal may transmit a NACK to the base station as an HARQ response for the downlink data. Upon receiving the NACK from the terminal, the base station may perform a retransmission procedure of the downlink data.

Figure 9:
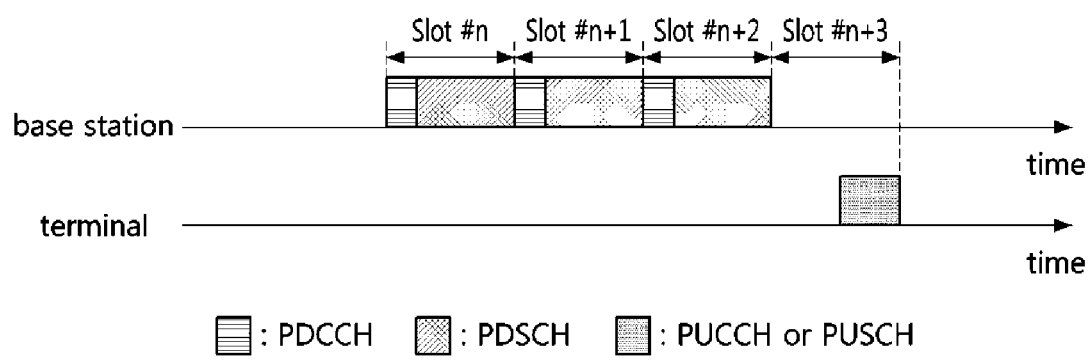
FIG. 9 is a timing diagram illustrating a first exemplary embodiment of a method for transmitting feedback information in a wireless communication system.

FIG. 9 is a timing diagram illustrating a first exemplary embodiment of a method for transmitting feedback information in a wireless communication system.

Referring to FIG. 9, the base station may transmit a control channel (e.g., PDCCH) and a data channel (e.g., PDSCH) scheduled by the PDCCH to the terminal in a slot #n. The terminal may obtain downlink control information (DCI) by receiving the PDCCH. The DCI may include information (e.g., scheduling information) necessary for reception of the PDSCH. The terminal may obtain information on time and frequency resources of the PDSCH (e.g., PDSCH of the slot #n), information on a modulation and coding scheme (MCS) of the PDSCH, and the like by receiving the PDCCH in the slot #n. In the following exemplary embodiments, the PDCCH (e.g., DCI) of the slot #n may refer to the PDCCH (e.g., DCI) transmitted or received in the slot #n, and the PDSCH of the slot #n may refer to the PDSCH transmitted or received in the slot #n.

In addition, the terminal may obtain configuration information for transmitting an HARQ response for the PDSCH scheduled by the corresponding DCI by receiving the DCI in the slot #n. The configuration information for transmitting the HARQ response may include information on time and/or frequency resources used for transmitting the HARQ response. For example, the terminal may determine that the HARQ response for the PDSCH scheduled by the DCI of the slot #n (e.g., the PDSCH of the slot #n) is transmitted on a PUCCH or PUSCH of a slot #n+3.

The DCI may include information (e.g., time offset) indicating a time from a reception time point of the DCI (or PDSCH scheduled by the DCI) to a transmission time point of the HARQ response. For example, the time between the reception time point of the DCI (or PDSCH) and the transmission time point of the HARQ response may be expressed in units of symbols, slots, or subframes. The time between the reception time point of the DCI (or PDSCH) and the transmission time point of the HARQ response may be indicated by a field 'PDSCH-to-HARQ_feedback timing indicator' included in the DCI. Accordingly, the terminal may identify the transmission time point of the HARQ response for the PDSCH based on the 'PDSCH-to-HARQ_feedback timing indicator' field included in the DCI.

The base station may transmit a DCI and a PDSCH to the terminal in each of the slots #n to #n+2. HARQ responses for the PDSCHs transmitted in the slots #n to #n+2 may be configured to be transmitted in the PUCCH or PUSCH of the slot #n+3. In this case, the 'PDSCH-to-HARQ_feedback timing indicator' field included in the DCI of the slot #n may be set to 3. The 'PDSCH-to-HARQ_feedback timing indicator' field included in the DCI of the slot #n+1 may be set to 2. The 'PDSCH-to-HARQ_feedback timing indicator' field included in the DCI of the slot #n+2 may be set to 1.

The terminal may transmit the HARQ response for the corresponding PDSCH in the slot after the slot(s) corresponding to the value indicated in the 'PDSCH-to-HARQ_feedback timing indicator' field included in the scheduling DCI from the slot in which the PDSCH is received (or from the slot in which the DCI is received). In the following exemplary embodiments, a 'scheduling DCI' may refer to a DCI used for scheduling PDSCH transmission or PUSCH transmission.

Figure 10:
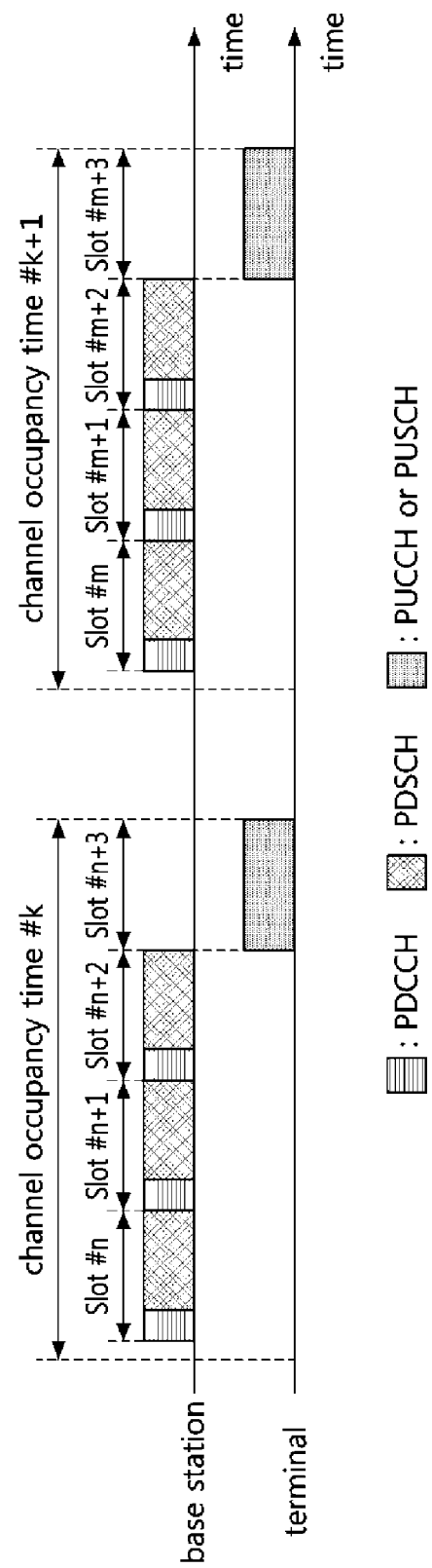
FIG. 10 is a timing diagram illustrating a second exemplary embodiment of a method for transmitting feedback information in a wireless communication system.

FIG. 10 is a timing diagram illustrating a second exemplary embodiment of a method for transmitting feedback information in a wireless communication system.

Referring to FIG. 10, one or more COTs may be configured in an unlicensed band. The COT may be configured by the base station or the terminal. The base station may secure a COT #k by performing a channel sensing operation (e.g., LBT operation), and may perform downlink transmission in slots #n to #n+2 within the COT #k. A DCI of the slot #n may include information indicating that an HARQ response for a PDSCH scheduled by the corresponding DCI (e.g., PDSCH of the slot #n) is transmitted on a PUCCH or PUSCH of the slot #n+3. A DCI of the slot #n+1 may include information indicating that an HARQ response for a PDSCH scheduled by the corresponding DCI (e.g., PDSCH of the slot #n+1) is transmitted on a PUCCH or PUSCH of the slot #n+3.

Meanwhile, the terminal may not transmit an HARQ response for a PDSCH of the slot #n+2 in the slot #n+3. After the COT #k in the unlicensed band, the channel may be occupied by another communication node, and in this case, a time point at which resources for transmitting the HARQ response for the PDSCH of the slot #n+2 are secured may be unclear. A COT #k+1 may be secured after a certain time from the COT #k, and the HARQ response for the PDSCH of the slot #n+2 may be transmitted in a slot #m+3 of the COT #k+1. An interval between the slot #n+2 of the COT #k and the slot #m+3 of the COT #k+1 may be p slots. p may be an integer equal to or greater than 1.

In this case, the base station may generate a DCI including information (e.g., 'PDSCH-to-HARQ_feedback timing indicator' field) indicating that the transmission resource of the HARQ response for the PDSCH of the slot #n+2 is undefined, and transmit the generated DCI on the PDCCH of the slot #n+2. That is, the base station may inform the terminal of information indicating that a transmission resource (e.g., transmission time point, transmission timing) of an HARQ response for a PDSCH transmitted in a specific slot is undefined. The information indicating that the transmission resource of the HARQ response for the PDSCH is undefined may be included in the scheduling DCI. In the following exemplary embodiments, the HARQ response for which the transmission resource is not defined may be referred to as an 'undefined HARQ response'.

For example, the base station may configure 'dl-DataToUL-ACK' which is a radio resource control (RRC) parameter, and may transmit 'dl-DataToUL-ACK' to the terminal. The 'dl-DataToUL-ACK' may be a sequence indicating a value between 0 and 15. The 'PDSCH-to-HARQ_feedback timing indicator' field included in the DCI may indicate one or more values among values (e.g., candidate transmission resources) configured by the 'dl-DataToUL-ACK'. When the 'dl-DataToUL-ACK' is configured as a sequence having a value between 0 and 7 (e.g., 3-bit sequence), the 'PDSCH-to-HARQ_feedback timing indicator' field (e.g., 3 bits) included in the DCI may indicate a value from 0 to 7.

For example, when the 'dl-DataToUL-ACK' is configured as an 8-bit sequence (or 3-bit sequence), a value between 0 and 14 represented by the 8-bit sequence (or 3-bit sequence) may indicate a candidate transmission resource of the HARQ response, and 15 represented by the 8-bit sequence (or 3-bit sequence) may indicate that the transmission resource of the HARQ response is undefined. When the 'dl-DataToUL-ACK' is configured as a 3-bit sequence, the 3-bit sequence may indicate one of eight values (e.g., 0, 2, 4, 6, 8, 10, 12, and 15) among values 0 to 15. When the 'PDSCH-to-HARQ_feedback timing indicator' field included in the DCI is set to a value (e.g., 15) indicating that the transmission resource of the HARQ response is undefined among the values configured by the 'dl-DataToUL-ACK', the terminal may determine that the transmission resource of the HARQ response for the PDSCH scheduled by the corresponding DCI is undefined. That is, the terminal may expect that the transmission resource of the HARQ response for the PDSCH is to be configured later.

Alternatively, when the 'dl-DataToUL-ACK' is configured as an 8-bit sequence (or 3-bit sequence), a value between 0 and 15 represented by the 8-bit sequence (or 3-bit sequence) may indicate a candidate transmission resource of the HARQ response. When the 'dl-DataToUL-ACK' is configured as a 3-bit sequence, the 3-bit sequence may indicate 8 values (e.g., 0, 2, 4, 6, 8, 10, 12, 15) among values 0 to 15. When a separate RRC signaling operation for informing transmission timing of the undefined HARQ response is performed, the base station and the terminal may interpret a value (e.g., 15) configured by the separate RRC signaling operation among the values of the 'dl-DataToUL-ACK' as the value indicating that the transmission resource of the HARQ response is undefined. When the 'PDSCH-to-HARQ_feedback timing indicator' field included in the DCI indicates the value (e.g., 15) configured by the separate RRC signaling operation, the terminal may determine that the transmission resource of the HARQ response for the PDSCH scheduled by the corresponding DCI is undefined. That is, the terminal may expect that the transmission resource of the HARQ response for the PDSCH is to be configured later.

Alternatively, when the 'dl-DataToUL-ACK' is configured as a 9-bit sequence (or 3-bit sequence), a value between 0 and 15 represented by the 9-bit sequence (or 3-bit sequence) may indicate a candidate transmission resource of the HARQ response, and the remaining value (e.g., 16) represented by the 9-bit sequence (or 3-bit sequence) may indicate that the transmission resource of the HARQ response is undefined. When the 'dl-DataToUL-ACK' is configured as a 3-bit sequence, the 3-bit sequence may indicate 8 values (e.g., 0, 2, 4, 6, 8, 10, 12, 16) among values 0 to 16. When the 'PDSCH-to-HARQ_feedback timing indicator' field included in the DCI is set to the value indicating that the transmission resource of the HARQ response is undefined among the values configured by the 'dl-DataToUL-ACK', the terminal may determine that the transmission resource of the HARQ response for the PDSCH scheduled by the corresponding DCI is undefined. That is, the terminal may expect that the transmission resource of the HARQ response for the PDSCH is to be configured later.

Meanwhile, the terminal may store the 'undefined HARQ response' and/or 'HARQ process related information/resource for the undefined HARQ response' until receiving a separate instruction from the base station. The base station may configure a separate transmission resource for the undefined HARQ response, and may transmit configuration information of the separate transmission resource to the terminal. The terminal may transmit the HARQ response (e.g., undefined HARQ response) using the transmission resource indicated by the configuration information received from the base station.

Alternatively, the base station may inform the terminal of information (e.g., timer) indicating a time (e.g., minimum time) for which the 'undefined HARQ response' and/or 'HARQ process related information/resource for the undefined HARQ response' are stored by using an RRC message, a medium access control (MAC) control element (CE), and/or a DCI. The terminal may store the 'undefined HARQ response' and/or 'HARQ process related information/resource for the undefined HARQ response' for the time indicated by the information received from the base station.

When the information received from the base station is a timer, the timer may indicate a time from the reception time point of the PDSCH to a time point at which the terminal deletes the 'undefined HARQ response' and/or 'HARQ process related information/resource for the undefined HARQ response' for the corresponding PDSCH. The timer may be expressed in units of symbols, slots, or subframes. When the timer is configured, the PDSCH is received, and the transmission resource of the HARQ response for the PDSCH is undefined, the terminal may not store the 'undefined HARQ response' and/or 'HARQ process related information/resource for the undefined HARQ response' after a lapse of the time according to the timer from the reception time point of the corresponding PDSCH. The timer may be initialized when the transmission resource of the undefined HARQ response is indicated by the base station.

Hereinafter, HARQ response transmission methods when the transmission resource of the HARQ response for the PDSCH is undefined will be described. The transmission resource of the HARQ response for the PDSCH transmitted in the slot #n+2 shown in FIG. 10 may be configured as undefined. In this case, the HARQ response for the PDSCH of the slot #n+2 may not be transmitted in the slot #n+3 within the COT #k. The HARQ response for the PDSCH of the slot #n+2 may be transmitted in a COT (e.g., COT #k+1) after the COT #k. For example, the HARQ response for the PDSCH of the slot #n+2 may be transmitted in the slot #m+3 within the COT #k+1.

The base station may transmit to terminal information requesting to transmit the HARQ response not transmitted in the previous COT within the current COT. For example, when the HARQ response for the PDSCH of the slot #n+2 is not transmitted within the COT #k shown in FIG. 10, the base station may transmit to the terminal information requesting to transmit the HARQ response for the PDSCH of the slot #n+2 within the COT #k+1. For example, the base station may transmit a separate DCI to the terminal to instruct the transmission of the HARQ response for the PDSCH of the slot #n+2. The separate DCI may include information on a transmission resource for the HARQ response (e.g., HARQ response for the PDSCH of the slot #n+2) that the terminal did not transmit. The terminal may identify the transmission resource for the HARQ response by receiving the separate DCI, and transmit the HARQ response (e.g., HARQ response for the PDSCH of the slot #n+2 in the COT #k) in the transmission resource (e.g., the slot #m+3 within the COT #k+1) indicated by the separated DCI.

The separate DCI may be a group-common DCI that a plurality of terminals in a cell can receive. A terminal may receive the group-common DCI from the base station, and may identify information on the transmission resource for the HARQ response (e.g., undefined HARQ response) included in the group-common DCI. The terminal may transmit the HARQ response by using the resource indicated by the information on the transmission resource included in the group-common DCI. When the transmission resource of the HARQ response for the PDSCH of the slot #n+2 in the COT #k shown in FIG. 10 is configured as undefined, the terminal may identify the transmission resource of the corresponding HARQ response by receiving the group-common DCI, and transmit the corresponding HARQ response in the identified transmission resource (e.g., the slot #m+3 within the COT #k). The number of HARQ responses transmitted by the terminal may be determined based on a downlink assignment index (DAI) field included in the DCI.

Alternatively, the base station may transmit a DCI including information on the transmission resource for the undefined HARQ response. Here, the DCI may be a DCI scheduling a PDSCH associated with the undefined HARQ response. A specific field included in the DCI may indicate the transmission resource for the undefined HARQ response. The terminal may receive the DCI from the base station, and may transmit the HARQ response to the base station using the transmission resource indicated by the DCI.

Meanwhile, the base station may transmit a DCI including information indicating that the transmission resource of the HARQ response for the PDSCH of the slot #n+2 within the COT #k shown in FIG. 10 is undefined. The terminal may receive the DCI from the base station, and may not transmit the HARQ response for the PDSCH of the slot #n+2 within the COT #k based on the information included in the DCI. The base station may transmit a DCI (e.g., PDCCH) and a PDSCH scheduled by the corresponding DCI to the terminal in the slot #m within the COT #k+1 shown in FIG. 10.

The DCI of the slot #m may include information indicating the transmission resource (e.g., a PUCCH or PUSCH of the slot #m+3) of the HARQ response for the PDSCH of the slot #m. In addition, the DCI of the slot #m may indicate the transmission resource (e.g., a PUCCH or PUSCH of the slot #m+3) for the HARQ response (e.g., undefined HARQ response) that was not transmitted within the COT #k. That is, according to the DCI of the slot #m, the transmission resource of the HARQ response for the PDSCH of the slot #m may be configured to be the same as the transmission resource of the HARQ response for the PDSCH of the slot #n+2. The terminal may identify the information on the transmission resource of the HARQ response for the PDSCH of the slot #m and the information of the transmission resource of the HARQ response for the PDSCH of the slot #n+2 by receiving the DCI in the slot #m, and transmit the HARQ responses in the identified transmission resource.

When the transmission resource of the HARQ response for the PDSCH is configured as undefined, the base station may transmit to the terminal a DCI including a field indicating the transmission resource of the undefined HARQ response. When there is an HARQ response that has not been transmitted (e.g., when there is an undefined HARQ response), the terminal may transmit the corresponding HARQ response by using the resource indicated by the DCI.

In the slot #n+2 of the COT #k shown in FIG. 10, the terminal may receive the DCI (e.g., PDCCH) and the PDSCH scheduled by the corresponding DCI. The DCI of the slot #n+2 may indicate that the transmission resource of the HARQ response for the PDSCH of the slot #n+2 is undefined. Therefore, the terminal may not transmit the HARQ response for the PDSCH of the slot #n+2 within the COT #k. In the slot #m of the COT #k+1 after the COT #k, the terminal may receive the DCI (e.g., PDCCH) and the PDSCH scheduled by the corresponding DCI. The DCI of the slot #m may indicate that the transmission resource of the HARQ response for the PDSCH of the slot #m is a PUCCH or PUSCH of the slot #m+3. In this case, the terminal may transmit the HARQ response for the PDSCH of the slot #n+2 as well as the HARQ response for the PDSCH of the slot #m in the slot #m+3 within the COT #k+1.

The DAI field included in the DCI may indicate the number of HARQ responses transmitted in one slot. In this case, the terminal may determine the number of HARQ responses to be transmitted in the slot #m+3 based on the value of the DAI field included in the DCI. For example, when the value of the DAI field included in the DCI indicates that the number of HARQ responses to be transmitted in the slot #m+3 is 2, the terminal may transmit the undefined HARQ response (e.g., the HARQ response for the PDSCH scheduled by the DCI of the slot #n+2) as well as the HARQ response for the PDSCH scheduled by the DCI of the slot #m, in the slot #m+3. When transmitting the undefined HARQ response without an indication from the base station, the terminal may transmit the undefined HARQ response using the earliest transmission resource among transmission resources of other HARQ responses configured by the base station.

Meanwhile, a PDSCH may belong to a specific PDSCH group, and information (e.g., PDSCH group index) of the PDSCH group to which the PDSCH belongs may be transmitted from the base station to the terminal through a DCI. Whether to perform a detection operation on the DCI including the information of the PDSCH group may be indicated by an RRC message (e.g., higher layer message). When it is indicated that the detection operation on the DCI including the information of the PDSCH group is performed, the terminal may perform the detection operation on the DCI. For example, the base station may transmit the DCI and the PDSCH scheduled by the DCI. The DCI may include the information (e.g., PDSCH group index) of the PDSCH group to which the PDSCH scheduled by the DCI belongs. The terminal may receive the DCI from the base station, and may identify the PDSCH group to which the PDSCH scheduled by the DCI belongs based on the information of the PDSCH group included in the DCI.

The maximum number of PDSCH groups may vary depending on the terminal. The terminal may transmit information indicating the maximum number of PDSCH groups that the terminal is capable of supporting to the base station. The base station may configure the total number of PDSCH groups for the terminal based on the maximum number of PDSCH groups supported by the terminal. The base station may transmit an RRC message (e.g., higher layer message) including information indicating the total number of PDSCH groups to the terminal. The terminal may identify the total number of PDSCH groups by receiving the RRC message. When the total number of PDSCH groups is configured by the RRC signaling, the terminal may perform a detection operation on the DCI including the information of the PDSCH group.

The base station may transmit to the terminal an RRC message including information indicating whether to perform the detection operation on the DCI including the information of the PDSCH group. The terminal may determine whether to perform the detection operation on the DCI including the information of the PDSCH group by receiving the RRC message from the base station. When the detection operation including the information of the PDSCH group is requested, the terminal may perform the DCI detection operation, and may identify the information of the PDSCH group included in the detected DCI.

When the information indicating whether to perform the detection operation on the DCI including the information of the PDSCH group is configured by the RRC signaling, the number of PDSCH groups may be a preconfigured value. In this case, the number of PDSCH groups may be 2. Accordingly, the terminal may assume that the number of PDSCH groups is 2 when the RRC message including the information indicating whether to perform the detection operation on the DCI including the information of the PDSCH group is received. Alternatively, when the information indicating whether to perform the detection operation on the DCI including the information of the PDSCH group is not configured by the RRC signaling, the number of PDSCH groups may be a preconfigured value. In this case, the number of PDSCH groups may be 1. Accordingly, the terminal may assume that the number of PDSCH groups is 1 when the RRC message including the information indicating whether to perform the detection operation on the DCI including the information of the PDSCH group is not received.

The base station may transmit to the terminal information instructing to transmit HARQ responses for PDSCHs belonging to the same PDSCH group using the same PUCCH or PUSCH. In this case, the terminal may transmit HARQ responses for PDSCHs belonging to the same PDSCH group to the base station using the same PUCCH or PUSCH. The terminal may expect not to receive the information instructing to transmit HARQ responses for PDSCHs belonging to the same PDSCH group using different PUCCHs or PUSCHs from the base station. For example, when a PDSCH A and a PDSCH B belong to the same PDSCH group, and information instructing to transmit an HARQ response for the PDSCH A using a PUCCH A is received from the base station, the terminal may determine that the information received from the base station instructs to transmit an HARQ response for the PDSCH B belonging to the same PDSCH group as that of the PDSCH A by using the PUCCH A.

When information instructing to transmit HARQ responses for PDSCHs belonging to the same PDSCH group using different PUCCHs or PUSCHs is received from the base station, the terminal may not transmit the corresponding HARQ responses. Alternatively, when the information instructing to transmit HARQ responses for PDSCHs belonging to the same PDSCH group using different PUCCHs or PUSCHs is received from the base station, the terminal may transmit the HARQ response(s) for the PDSCH(s) belonging to the same PDSCH group by using the most recently configured PUCCH among PUCCHs configured by the base station.

For example, when the information instructing to transmit HARQ responses for the PDSCH A and the PDSCH B belonging to the same PDSCH group using different PUCCHs or PUSCHs is received from the base station, the terminal may transmit the HARQ responses for the PDSCH A and the PDSCH B belonging to the same PDSCH group by using a PUCCH or PUSCH indicated by the most recently received DCI among a DCI A scheduling the PDSCH A and a DCI B scheduling the PDSCH B.

The PUCCH or PUSCH for transmission of the HARQ responses for the PDSCHs belonging to the same PDSCH group may be determined based on the most recently received DCI. The PUCCH or PUSCH for transmission of the HARQ responses for the PDSCHs belonging to the same PDSCH group may be changed or updated by a DCI scheduling a PDSCH belonging to the same PDSCH group or a DCI triggering transmission of an HARQ response associated with the same PDSCH group.

The base station may transmit to the terminal information requesting to transmit an HARQ response for a PDSCH belonging to a specific PDSCH group. When the information requesting to transmit the HARQ response is received from the base station, the terminal may transmit the HARQ response for the PDSCH belonging to the specific PDSCH group to the base station. The base station may transmit a DCI (e.g., DCI used for uplink or downlink scheduling) including the information requesting to transmit the HARQ response for the PDSCH belonging to the PDSCH group to the terminal. Alternatively, the base station may transmit to the terminal a terminal-specific DCI (e.g., a DCI other than the DCI used for scheduling) including the information requesting to transmit the HARQ response for the PDSCH belonging to the PDSCH group. Alternatively, the base station may transmit to the terminal a group common DCI including the information requesting to transmit the HARQ response for the PDSCH belonging to the PDSCH group.

The base station may transmit to the terminal information requesting to transmit HARQ response(s) for PDSCH(s) belonging to one or more PDSCH groups. In this case, the terminal may transmit the HARQ response(s) for the PDSCH(s) belonging to one or more PDSCH groups to the base station. The base station may transmit to the terminal information requesting to transmit HARQ response(s) for PDSCH(s) belonging to one or more PDSCH groups on the same PUCCH or PUSCH. In this case, the terminal may transmit to the base station the HARQ response(s) for the PDSCH(s) belonging to one or more PDSCH groups using the same PUCCH or PUSCH.

The base station may transmit to the terminal a DCI including information instructing to transmit HARQ response(s) for PDSCH(s) belonging to one or more PDSCH groups. A field indicating one or more PDSCH groups included in the DCI may be configured as a bitmap. The length of the field (e.g., the length of the bitmap) indicating one or more PDSCH groups included in the DCI may be equal to or greater than the length corresponding to the total number of PDSCH groups. The base station may configure the field (e.g., length of the field, length of the bitmap) indicating one or more PDSCH groups included in the DCI using an RRC message (e.g., higher layer message). The field (e.g., bitmap) indicating one or more PDSCH groups included in the DCI may indicate one or more PDSCH groups to which the PDSCH(s) associated with the HARQ response(s) to be transmitted belong. The DCI may further include timing information (e.g., transmission resource information) for transmission of the HARQ response for the PDSCH belonging to the PDSCH group.

The terminal may receive the DCI from the base station, and may determine that the transmission of HARQ response(s) for PDSCH(s) belonging to one or more PDSCH groups is requested based on the information included in the DCI. Accordingly, the terminal may transmit the HARQ response(s) for the PDSCH(s) belonging to one or more PDSCH groups to the base station. The terminal may transmit HARQ response(s) for PDSCH(s) belonging to one or more PDSCH groups among PDSCH groups configured by an RRC message (e.g., higher layer message). The terminal may identify information on the PDSCH group(s) to which the PDSCH(s) associated with the HARQ response(s) to be transmitted belong among the PDSCH groups belong based on the field included in the DCI. The field may be configured as a bitmap, and the length of the field (e.g., the length of the bitmap) may be configured by an RRC message (e.g., higher layer message). The terminal may transmit to the base station an HARQ response for a PDSCH belonging to a PDSCH group corresponding to a bit set to '0' in the bitmap. Alternatively, the terminal may transmit to the base station an HARQ response for a PDSCH belonging to a PDSCH group corresponding to a bit set to '1' in the bitmap.

The number of timing information or PUCCH resource information for transmission of the HARQ response, which is included in the DCI, may be 1. The DCI may include resource information of a PUCCH for transmission of the HARQ response for the PDSCH belonging to the PDSCH group. The number of resource information of the PUCCH included in the DCI may be 1.

The base station may transmit to the terminal the DCI including timing information or resource information of the PUCCH for transmission of the HARQ response(s) for the PDSCH(s) belonging to one or more PDSCH groups. The DCI may indicate that the HARQ responses for the PDSCHs belonging to a plurality of PDSCH groups are transmitted using the same PUCCH.

The terminal may transmit to the base station HARQ response(s) for PDSCH(s) belonging to one or more PDSCH groups based on the timing information or the resource information of the PUCCH included in DCI. The terminal may transmit HARQ response(s) for PDSCH(s) belonging to a plurality of PDSCH groups to the base station through the same PUCCH indicated by the timing information or the resource information of the PUCCH included in the DCI. When the HARQ response(s) for the PDSCH(s) belonging to a plurality of PDSCH groups are transmitted through the same PUCCH, a codebook (e.g., codebook of HARQ ACK(s)) of the HARQ response may be configured according to an index of the PDSCH group. When configuring the codebook of HARQ response, the index of the PUCCH resource may be allocated in the order of the index of the PDSCH group.

For example, an HARQ response for a PDSCH belonging to a PDSCH group having a low index among a plurality of PDSCH groups may be placed in a PUCCH resource having a low index, and an HARQ response for a PDSCH belonging to a PDSCH group having a high index may be placed in a PUCCH resource having a high index. Alternatively, an HARQ response for a PDSCH belonging to a PDSCH group having a low index among a plurality of PDSCH groups may be placed in an earlier resource, and an HARQ response for a PDSCH belonging to a PDSCH group having a high index may be placed in a later resource.

Next, transmission methods of an undefined HARQ response will be described. The base station may transmit to the terminal an RRC message (e.g., higher layer message) including information indicating whether to perform a detection operation on the DCI including information of the PDSCH group (e.g., PDSCH group index). In addition, the base station may transmit the DCI including the information of the PDSCH group to the terminal. The DCI may be used to schedule transmission of the PDSCH and may indicate the PDSCH group to which the PDSCH scheduled by the corresponding DCI belongs. For example, a field (e.g., bit or bitmap) included in the DCI may indicate the PDSCH group to which the PDSCH scheduled by the corresponding DCI belongs. When the field included in the DCI is set to '0', this may indicate that the PDSCH group to which the PDSCH scheduled by the DCI belongs is a 'PDSCH group #0'. When the field included in the DCI is set to '1', this may indicate that the PDSCH group to which the PDSCH scheduled by the DCI belongs is a 'PDSCH group #1'. The terminal may receive the DCI from the base station, and may identify the scheduling information of the PDSCH and the PDSCH group to which the PDSCH belongs based on the information included in the DCI.

The base station may transmit information indicating that the transmission resource of the HARQ response for the PDSCH is undefined. The information indicating that the transmission resource of the HARQ response for the PDSCH is undefined may be included in the DCI scheduling the PDSCH. In addition, the DCI may indicate information of the PDSCH group to which the PDSCH scheduled by the DCI belongs.

The base station may schedule a PDSCH (hereinafter referred to as 'PDSCH B') belonging to the same PDSCH group as that of a PDSCH (hereinafter referred to as 'PDSCH A') associated with the undefined HARQ response. The base station may transmit information indicating the transmission resource of the HARQ response for the PDSCH B to the terminal. When the PDSCH group to which PDSCH A belongs is the same as the PDSCH group to which PDSCH B belongs, the transmission resource of the HARQ response for the PDSCH B may be used to transmit the HARQ response (e.g., undefined HARQ response) for the PDSCH A.

For example, the base station may configure the PDSCH A belonging to the PDSCH group #0, and may configure the transmission resource of the HARQ response for the PDSCH A as undefined. The base station may transmit a DCI A including information of the PDSCH group #0 to which the PDSCH A belongs and information indicating that the transmission resource of the HARQ response for the PDSCH A is undefined. The DCI A may be used to schedule the transmission of the PDSCH A. The DCI A may be transmitted in a time interval X. The terminal may receive the DCI A from the base station, may determine that the PDSCH A belongs to the PDSCH group #0 based on the information included in the DCI A, and may determine that the transmission resource of the HARQ response for the PDSCH A is undefined.

In addition, the base station may configure the PDSCH B belonging to the PDSCH group #0, and may configure the transmission resource of the HARQ response for the PDSCH B as K. The base station may transmit to the terminal a DCI B including information of the PDSCH group #0 to which the PDSCH B belongs and information of the transmission resource (e.g., K) of the HARQ response for the PDSCH B. K may be used to identify the transmission resource of the HARQ response for the PDSCH B. K may be set to a positive integer. The DCI B may be used to schedule the transmission of the PDSCH B. The DCI B may be transmitted in a time interval Y. The time interval Y may be a time interval after the time interval X.

When the PDSCH group to which the PDSCH A belongs and the PDSCH group to which the PDSCH B belongs are the same, the transmission resource of the HARQ response indicated by the DCI B may be used for the transmission of the HARQ response (e.g., undefined HARQ response) for the PDSCH A. That is, the terminal may identify the PDSCH group to which the PDSCH A and the PDSCH B belong, and when the PDSCH group to which the PDSCH A belongs and the PDSCH group to which the PDSCH B belongs are the same, the terminal may determine that the transmission resource of the HARQ response indicated by the DCI B is used for the transmission of the HARQ response (e.g., undefined HARQ response) for the PDSCH A. Accordingly, the terminal may transmit the HARQ response for the PDSCH B and the HARQ response for the PDSCH A by using the transmission resource of the HARQ response indicated by the DCI B.

Next, triggering methods for transmission of an HARQ response will be described. The base station may transmit a DCI including scheduling information of a PDSCH. The DCI may include information (e.g., PDSCH group index) of a PDSCH group to which the PDSCH scheduled by the DCI belongs and information of a transmission resource of an HARQ response for the PDSCH. In addition, the DCI may include information indicating transmission of the HARQ response for the PDSCH belonging to the PDSCH group. The PDSCH group may be indicated by a field included in the DCI, and the field included in the DCI may be configured in form of a bit or a bitmap. That is, the DCI may include afield indicating the PDSCH group, and transmission of the HARQ response for the PDSCH belonging to the PDSCH group indicated by the corresponding field may be triggered by the corresponding DCI.

When the transmission resource of the HARQ response indicated by the DCI is used for transmission of HARQ responses for PDSCHs belonging to a plurality of PDSCH groups, the DCI may further include a field indicating the plurality of PDSCH groups (e.g., a plurality of PDSCH groups including the PDSCH group to which the PDSCH scheduled by the DCI belongs). For example, the corresponding field may indicate all PDSCH groups.

The terminal may receive the DCI and may identify the scheduling information of the PDSCH included in the DCI. The terminal may identify the index of the PDSCH group to which the PDSCH scheduled by the DCI belongs based on the information included in the DCI, and may identify the transmission resource of the HARQ response for the PDSCH. The terminal may transmit the HARQ response for the PDSCH belonging to the (specific) PDSCH group based on the information included in the DCI.

The specific PDSCH group may be identified based on the field included in the DCI. The field indicating the specific PDSCH group may be configured in form of a bit or a bitmap. The terminal may transmit the HARQ response for the PDSCH belonging to the specific PDSCH group indicated by the field included in the DCI. When the field included in the DCI indicates other PDSCH group(s) as well as the PDSCH group to which the PDSCH scheduled by the DCI belongs, the terminal may transmit HARQ responses for PDSCHs belonging to the plurality of PDSCH groups indicated by the field included in the DCI. The HARQ responses may be transmitted through the transmission resource of the HARQ response indicated by the DCI. Alternatively, when the DCI indicates that the transmission resource of the HARQ response is undefined, the terminal may not transmit the HARQ responses for the PDSCHs belonging to the plurality of PDSCH groups.

For example, the base station may transmit a DCI A including scheduling information of a PDSCH A. The DCI A may include information indicating that the PDSCH A belongs to a PDSCH group #0, information on a transmission resource of an HARQ response for the PDSCH (e.g., PDSCH A) belonging to the PDSCH group #0, and the like.

In addition, the DCI A may further include information (e.g., information of 1 bit size) indicating that the transmission resource of the HARQ response indicated by the DCI A is used for transmission of HARQ responses for PDSCHs belonging to another PDSCH group (e.g., PDSCH group #1) as well as the PDSCH group #0. For example, the information set to '0' may indicate that the transmission resource of the HARQ response indicated by the DCI A is used for the transmission of the HARQ response for the PDSCH belonging to the PDSCH group #0. The information set to '1' may indicate that the transmission resource of the HARQ response indicated by the DCI A is used for transmission of the HARQ responses for the PDSCHs belonging to the PDSCH groups #0 and #1.

Alternatively, the DCI A may further include information (e.g., information of 1 bit size) indicating that the transmission resource of the HARQ response indicated by the corresponding DCI A is used for transmission of HARQ responses for PDSCHs belonging to all PDSCH groups. For example, the information set to '0' may indicate that the transmission resource of the HARQ response indicated by the DCI A is used for transmission of the HARQ response for the PDSCH belonging to the PDSCH group #0. The information set to '1' may indicate that the transmission resource of the HARQ response indicated by the DCI A is used for transmission of HARQ responses for PDSCHs belonging to all PDSCH groups.

Meanwhile, the terminal may identify scheduling information of the PDSCH A included in the DCI A by receiving the DCI A. In addition, the terminal may identify that the PDSCH A belongs to the PDSCH group #0 based on the information included in the DCI A. The terminal may transmit the HARQ response for the PDSCH (e.g., PDSCH A) belonging to the PDSCH group #0 to the base station by using the transmission resource of the HARQ response indicated by the DCI A.

The DCI A may indicate that the transmission resource of the HARQ response indicated by the DCI A is used for transmission of HARQ responses for PDSCHs belonging to the PDSCH group #0 and/or the PDSCH group #1. For example, when a specific field included in the DCI A is set to '0', the terminal may determine that the transmission resource of the HARQ response indicated by the DCI A is used for transmission of the HARQ response for the PDSCH belonging to the PDSCH group #0. When the specific field included in DCI A is set to '1', the terminal may determine that the transmission resource of the HARQ response indicated by the DCI A is used for transmission of the HARQ responses for PDSCHs belonging to the PDSCH groups #0 and #1. In this case, the terminal may transmit the HARQ responses for the PDSCHs belonging to the PDSCH groups #0 and #1 to the base station by using the transmission resource of the HARQ response indicated by the DCI A.

Alternatively, the DCI A may indicate that the transmission resource of the HARQ response indicated by the corresponding DCI A is used for transmission of HARQ responses for PDSCHs belonging to all PDSCH groups. For example, when a specific field included in the DCI A is set to '0', the terminal may determine that the transmission resource of the HARQ response indicated by the DCI A is used for transmission of the HARQ response for the PDSCH belonging to the PDSCH group #0. When the specific field included in DCI A is set to '1', the terminal may determine that the transmission resource of the HARQ response indicated by the DCI A is used for transmission of HARQ responses for PDSCHs belonging to all the PDSCH groups. In this case, the terminal may transmit the HARQ responses for the PDSCHs belonging to all the PDSCH groups to the base station by using the transmission resource of the HARQ response indicated by the DCI A.

When the DCI A indicates that the transmission resource of the HARQ response is undefined, the terminal may ignore the filed (e.g., field included in the DCI A) indicating the PDSCH group #0, the PDSCH groups #0 and #1, or all the PDSCH groups. In this case, the terminal may not perform the transmission of the HARQ response regardless of the information (e.g., PDSCH group #0, PDSCH groups #0 and #1, or all PDSCH groups) indicated by the specific field included in the DCI A. The transmission of the HARQ response may be suspended.

Meanwhile, the base station may inform the terminal of a new feedback indicator (NFI) indicating whether the HARQ response for the PDSCH is successfully received. The NFI may be transmitted from the base station to the terminal through a DCI. The DCI including the NFI may be a scheduling DCI or a group common DCI. When the HARQ response for the PDSCH is successfully received, the base station may transmit an NFI set to '1' (e.g., toggled NFI) to the terminal. When the HARQ response for the PDSCH is not successfully received, the base station may transmit an NFI set to '0' (e.g., non-toggled NFI) to the terminal.

The terminal may receive the NFI (e.g., DCI including the NFI) from the base station, and may identify whether the HARQ response for the PDSCH has been successfully received at the base station based on the NFI. The DCI including the NFI may be a scheduling DCI or a group common DCI. When the NFI is set to '1' (e.g., when the NFI is toggled), the terminal may determine that the HARQ response for the PDSCH has been successfully received at the base station. When the NFI is set to '0' (e.g., when the NFI is not toggled), the terminal may determine that the HARQ response for the PDSCH has not been received at the base station.

The base station may configure an NFI for each PDSCH group, and transmit the NFI for each PDSCH group to the terminal. In this case, the NFI may indicate whether reception of an HARQ response for a PDSCH belonging to a specific PDSCH group is successful. For example, the base station may transmit a DCI including information on a transmission resource of an HARQ response for a PDSCH belonging to a specific PDSCH group to the terminal. The terminal may receive the DCI from the base station, and may transmit the HARQ response for the PDSCH belonging to the specific PDSCH group based on the transmission resource information included in the DCI to the base station. The base station may configure an NFI indicating whether reception of the HARQ response for the PDSCH belonging to the specific PDSCH group is successful, and transmit the configured NFI to the terminal. The terminal may receive the NFI from the base station, and may identify whether the HARQ response has been successfully received based on the NFI.

When it is determined that the HARQ response has been successfully received at the base station, the terminal may initialize an HARQ buffer (e.g., HARQ memory) for the PDSCH belonging to the PDSCH group associated with the HARQ response (e.g., PDSCH group associated with the toggled NFI). In addition, the terminal may initialize an HARQ process (e.g., HARQ response information of the HARQ process) of the PDSCH belonging to the PDSCH group associated with the toggled NFI. The terminal may initialize the PDSCH group associated with the toggled NFI. The initialized state of the PDSCH group may be a state in which no PDSCH constituting the PDSCH group exists. That is, the initialized state of the PDSCH group may mean that a set constituting the PDSCH group is an empty set.

When the DCI scheduling the transmission of the PDSCH includes the NFI, the PDSCH scheduled by the DCI may be added to the PDSCH group indicated by the DCI. In this case, the existing PDSCH(s) included in the PDSCH group may be replaced with the PDSCH scheduled by the DCI.

When it is determined that the HARQ response has not been received at the base station, the terminal may maintain the HARQ buffer (e.g., HARQ memory) for the PDSCH belonging to the PDSCH group associated with the HARQ response (e.g., PDSCH group associated with the non-toggled NFI). In addition, the terminal may maintain the HARQ process (e.g., HARQ response information of the HARQ process) of the PDSCH belonging to the PDSCH group associated with the non-toggled NFI. The terminal may initialize the PDSCH group associated with the NFI that is not toggled. The terminal may add a new PDSCH to the PDSCH group associated with the non-toggled NFI.

Meanwhile, the base station may transmit the DCI including scheduling information of the PDSCH. The DCI may include an index of a PDSCH group, an NFI for an HARQ response for a PDSCH belonging to the PDSCH group, and the like. The DCI may include the NFI that is not toggled. When the DCI includes the non-toggled NFI and scheduling information of a PDSCH not belonging to the PDSCH group, the PDSCH scheduled by the corresponding DCI may be added to the PDSCH group.

When a PDSCH is added to the PDSCH group, the number of PDSCHs constituting the PDSCH group may increase. When the DCI includes the non-toggled NFI and scheduling information of a PDSCH not belonging to the PDSCH group, the size of the PDSCH group may be changed. Alternatively, when the DCI includes the non-toggled NFI and scheduling information of a PDSCH not belonging to the PDSCH group, the size of the PDSCH group may be maintained or increased. The base station may transmit to the terminal information on a transmission resource of an HARQ response for a PDSCH belonging to the PDSCH group whose size is changed. The terminal may transmit the HARQ response for the PDSCH to the base station based on the information of the PDSCH group which was most recently changed.

Depending on a relation between a transmission request time point of the HARQ response for the PDSCH group and a change time point of the PDSCH group according to the NFI, a range of PDSCHs requiring transmission of their HARQ responses in the PDSCH group may vary. When transmission of the HARQ response for the PDSCH group is requested after reception of the NFI (e.g., NFI causing the change of the PDSCH group), the terminal may transmit the HARQ response for the PDSCH belonging to the changed PDSCH group.

When transmission of the HARQ response for the PDSCH group is requested after a lapse of a specific time interval from the reception time point of the NFI (e.g., NFI causing the change of the PDSCH group), the terminal may transmit the HARQ response for the PDSCH belonging to the changed PDSCH group. When the transmission of the HARQ response for the PDSCH group is requested before a lapse of a specific time interval from the reception time point of the NFI (e.g., NFI causing the change of the PDSCH group), the terminal may transmit the HARQ response for the PDSCH belonging to the PDSCH group before the change.

When the NFI (e.g., NFI causing the change of the PDSCH group) is received after the transmission of the HARQ response for the PDSCH group is requested, the terminal may transmit the HARQ response for the PDSCH belonging to the PDSCH group before the change. When the NFI (e.g., NFI causing the change of the PDSCH group) is received after a lapse of a specific time interval from the transmission request time point of the HARQ response for the PDSCH group, the terminal may transmit the HARQ response for the PDSCH belonging to the PDSCH group before the change. When the NFI (e.g., NFI causing the change of the PDSCH group) is received before a lapse of a specific time interval from the transmission request time point of the HARQ response for the PDSCH group, the terminal may transmit the HARQ response for the PDSCH belonging to the changed PDSCH group.

When transmission of the HARQ response for the PDSCH group is requested, and the NFI (e.g., NFI causing the change of the PDSCH group) is received before the transmission of the HARQ response of the terminal, the terminal may transmit the HARQ response for the PDSCH belonging to the changed PDSCH group. When the transmission of the HARQ response for the PDSCH group is requested, and the NFI (e.g., NFI causing the change of the PDSCH group) is received before a lapse of a specific time interval from the transmission time point of the HARQ response of the terminal, the terminal may transmit the HARQ response for the PDSCH belonging to the changed PDSCH group. When the transmission of the HARQ response for the PDSCH group is requested, and the NFI (e.g., NFI causing the change of the PDSCH group) is received within a specific time interval from the transmission time point of the HARQ response of the terminal, the terminal may transmit the HARQ response for the PDSCH belonging to the PDSCH group before the change.

Meanwhile, a PDSCH group index may be fixed to an index indicated by a DCI scheduling initial transmission of the corresponding PDSCH. The terminal may assume that the size of the codebook of the HARQ response to be transmitted on a PUCCH does not change from information indicated by the DCI scheduling the initial transmission of the PDSCH. The terminal may assume that PDSCH group indexes for the same HARQ process identifier (ID) having a new data indicator (NDI) set to '0' are the same. The base station may transmit a DL grant, a UL grant, or a group common PDCCH including information on a transmission resource of an HARQ response for a specific PDSCH group.

A counter-downlink assignment indicator (C-DAI) and a total-downlink assignment indicator (T-DAI) for configuring the codebook of the HARQ response may be accumulated and calculated for the same PDSCH group. For example, the C-DAI and T-DAI for configuring the codebook of the HARQ response may be accumulated and calculated for a plurality of PDSCH groups transmitted through the same PUCCH.

The PDSCH group index indicated by the DCI scheduling the initial PDSCH transmission may be different from a PDSCH group index indicated by a DCI scheduling retransmission of the corresponding PDSCH. The codebook (e.g., the size of the codebook) of the HARQ response to be transmitted on the PUCCH may be configured based on information indicated by the most recently received DCI regardless of the information indicated by the DCI scheduling the initial PDSCH transmission. When the PDSCH group indexes for the same HARQ process ID having an NDI set to '0' are different, the terminal may configure the codebook of the HARQ response based on the most recently received PDSCH group index, and may transmit the HARQ response on the PUCCH based on the configured codebook.

The transmission resource of the HARQ response for the PDSCH may be indicated by a 'PDSCH-to-HARQ_feedback timing indicator' field included in the DCI. A plurality of transmission resources (e.g., candidate transmission resources) may be configured for transmission of an HARQ response for one PDSCH. The terminal may transmit the HARQ response for the PDSCH to the base station using one or more candidate transmission resources among the candidate transmission resources indicated by the base station. In this case, the HARQ response may be transmitted as follows.

Figure 11:
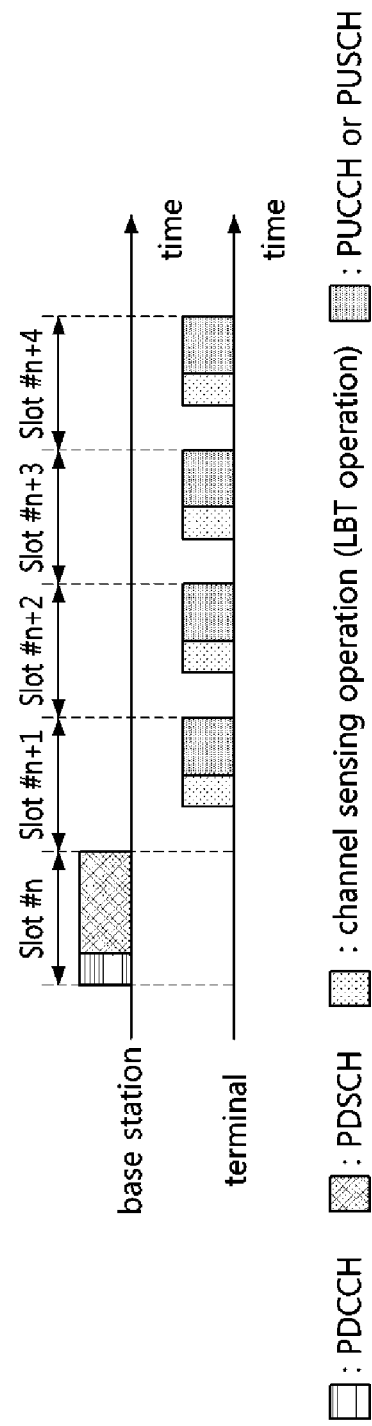
FIG. 11 is a timing diagram illustrating a third exemplary embodiment of a method for transmitting feedback information in a wireless communication system.

FIG. 11 is a timing diagram illustrating a third exemplary embodiment of a method for transmitting feedback information in a wireless communication system.

Referring to FIG. 11, the base station may transmit a DCI (e.g., PDCCH) and a PDSCH scheduled by the DCI in a slot #n. A transmission resource of an HARQ response for the PDSCH of the slot #n may be indicated by a 'PDSCH-to-HARQ_feedback timing indicator' field included in the DCI of the slot #n. The 'PDSCH-to-HARQ_feedback timing indicator' field included in the DCI may indicate a plurality of transmission resources (e.g., candidate transmission resources) for the HARQ response. For example, the DCI may indicate that the candidate transmission resources of the HARQ response for the PDSCH of the slot #n are PUCCHs or PUSCHs of the slots #n+1 to #n+4.

The base station may indicate the first candidate transmission resource among the candidate transmission resources of the HARQ response by using the 'PDSCH-to-HARQ_feedback timing indicator' field included in the DCI. The length of the candidate transmission resources (e.g., the first to last candidate transmission resources) of the HARQ response may be separately indicated.

When the candidate transmission resources of the HARQ response for the PDSCH of the slot #n are PUCCHs or PUSCHs in the slots #n+1 to #n+4, the 'PDSCH-to-HARQ_feedback timing indicator' field included in the DCI may indicate the slot #n+1 (e.g., PUCCH or PUSCH in the slot #n+1). In addition, the base station may inform the terminal of information indicating the number of the candidate transmission resources of the HARQ response. For example, the base station may transmit information indicating the number (e.g., 3) of slots (e.g., slots #n+2 to #n+4) except the slot #n+1 to the terminal using the 'PDSCH-to-HARQ_feedback timing indicator' field included in the DCI. Alternatively, the base station may transmit information indicating the number (e.g., 4) of slots (e.g., slots #n+1 to #n+4) including the slot #n+1 to the terminal using the 'PDSCH-to-HARQ_feedback timing indicator' field included in the DCI.

Information indicating the number of the candidate transmission resources (e.g., the number of slots) of the HARQ response may be transmitted through an RRC message. The information indicating the number of the candidate transmission resources of the HARQ response may be referred to as a 'HARQ window'. When the HARQ window is configured in the terminal by RRC signaling, candidate transmission resources may be configured for transmission of an HARQ response for one PDSCH. The terminal may determine the transmission resource for the HARQ response for the PDSCH based on the HARQ window and the 'PDSCH-to-HARQ_feedback timing indicator' field included in the DCI.

The base station may transmit an RRC message including information indicating the HARQ window set to '4' to the terminal, and may transmit the DCI including the 'PDSCH-to-HARQ_feedback timing indicator' field indicating the slot #n+1 to the terminal. The terminal may receive the RRC message and the DCI, and may determine that the candidate transmission resources for the HARQ response for the PDSCH are the slots #n+1 to #n+4 based on the information included in the RRC message and the DCI. The terminal may transmit the HARQ response on a PUCCH or PUSCH of one slot among the slots #n+1 to #n+4.

The base station may configure a separate field in the DCI to indicate the candidate transmission resources for the HARQ response for the PDSCH. For example, the scheduling DCI may include a field (hereinafter, referred to as a 'DCI-HARQ window' field) indicating the number of the candidate transmission resources for the HARQ response. The 'PDSCH-to-HARQ_feedback timing indicator' field included in DCI may indicate the first candidate transmission resource among the candidate transmission resources for the HARQ response, and the 'DCI-HARQ window' field included in DCI may indicate the number of the candidate transmission resources for the HARQ response.

For example, when the 'PDSCH-to-HARQ_feedback timing indicator' field included in the DCI of the slot #n indicates the slot #n+2, and the 'DCI-HARQ window' field included in the slot #n indicates 2, the terminal may determine that the candidate transmission resources for HARQ response to the PDSCH of the slot #n are slots #n+2 to #n+4. Accordingly, the terminal may transmit the HARQ response for the PDSCH of the slot #n using a PUCCH or PUSCH of one slot among the slots #n+2 to #n+4.

Meanwhile, the candidate transmission resources for the HARQ response to the PDSCH of the slot #n may be configured as the slots #n+1 to #n+4. In this case, the terminal may transmit the HARQ response through PUCCH(s) or PUSCH(s) of one or more slots among the slots #n+1 to #n+4.

For example, the terminal may attempt to transmit the HARQ response from a slot (e.g., slot #n+1) that is early in time among the slots #n+1 to #n+4. The terminal may perform a channel sensing operation (e.g., LBT operation) in the slot #n+1, and when the channel is determined to be in idle state as a result of performing the channel sensing operation, the terminal may transmit the HARQ response on a PUCCH or PUSCH of the slot #n+1. On the other hand, when the channel is determined to be busy as the result of performing the channel sensing operation in the slot #n+1, the terminal may not transmit the HARQ response in the slot #n+1. In this case, the terminal may attempt to transmit the HARQ response in the slot #n+2 after the slot #n+1.

The terminal may attempt to transmit the HARQ response until at least one transmission of the HARQ response in the candidate transmission resources for the HARQ response is successful. When the HARQ response for the PDSCH is transmitted, the transmission of the HARQ response may not be performed in the remaining candidate transmission resources for the HARQ response. When the candidate transmission resources of the HARQ response for the PDSCH of the slot #n are the slots #n+1 to #n+4, and the HARQ response for the PDSCH of the slot #n is transmitted in the slot #n+1, the terminal may not transmit the HARQ response in the slots #n+2 to #n+4.

Alternatively, the terminal may transmit the HARQ response in all the candidate transmission resources for the HARQ response. When the candidate transmission resources of the HARQ response for the PDSCH of the slot #n are the slots #n+1 to #n+4, and the HARQ response for the PDSCH of the slot #n is transmitted in the slot #n+1, the terminal may transmit the HARQ response in the slots #n+2 to #n+4. That is, regardless of whether the HARQ response is successfully transmitted, the terminal may transmit the HARQ response in all the candidate transmission resources for the HARQ response.

The transmission scheme of the HARQ response may be classified into a 'scheme of transmitting the HARQ response in one candidate transmission resource' and a 'scheme of transmitting the HARQ response in all candidate transmission resources'. The transmission scheme of the HARQ response may vary depending on a method of configuring the codebook of the HARQ response. When the codebook of the HARQ response is configured in a semi-static manner, the terminal may transmit the HARQ response in all the candidate transmission resources for the HARQ response. When the codebook of the HARQ response is configured in a dynamic manner, if transmission of the HARQ response is successful in one candidate transmission resource for the HARQ response, the terminal may not transmit the HARQ response in the remaining candidate transmission resources for the HARQ response.

Meanwhile, one transmission resource for an HARQ response for one PDSCH may be configured, and the terminal may not transmit the HARQ response in one transmission resource. In this case, the corresponding HARQ response may be transmitted based on the following exemplary embodiments. Referring back to FIG. 10, the base station may transmit a DCI (e.g., PDCCH) and a PDSCH scheduled by the DCI to the terminal in the slot #n. The DCI of the slot #n may indicate that the transmission resource of the HARQ response for the PDSCH of the slot #n is the slot #n+3. The terminal may receive the DCI and the PDSCH in the slot #n, and may attempt to transmit the HARQ response for the PDSCH of the slot #n in the slot #n+3. Depending on a channel situation, the HARQ response may not be transmitted successfully in the slot #n+3.

Thereafter, the base station may transmit a DCI (e.g., PDCCH) and a PDSCH scheduled by the DCI to the terminal in the slot #m shown in FIG. 10. The DCI of the slot #m may indicate that the transmission resource of the HARQ response for the PDSCH of the slot #m is the slot #m+3. The terminal may receive the DCI and the PDSCH in the slot #m, and may attempt to transmit the HARQ response for the PDSCH of the slot #m in the slot #m+3. In addition, the terminal may transmit not only the HARQ response for the PDSCH of the slot #m but also the HARQ response for the PDSCH of the slot #n in the slot #m+3.

When the HARQ response is not transmitted in the transmission resource indicated by the DCI (e.g., scheduling DCI), the corresponding HARQ response may be transmitted in the next transmission resource. When the transmission resource for the HARQ response for the PDSCH of the slot #n shown in FIG. 10 is configured as the slot #n+3, the terminal may not transmit the HARQ response for the PDSCH of the slot #n in the slot #n+3. Thereafter, the terminal may receive a DCI and a PDSCH scheduled by the DCI from the base station in the slot #m. When the transmission resource for the HARQ response for the PDSCH of the slot #m is configured as the slot #m+3, the terminal may transmit the HARQ response for the PDSCH of the slot #n and the HARQ response for the PDSCH of the slot #m in the slot #m+3. The number of HARQ responses that can be transmitted in the slot #m+3 may be determined based on a DAI field included in the DCI (e.g., DCI of the slot #m).

Alternatively, when the HARQ response is not transmitted in the transmission resource indicated by the DCI, the terminal may transmit the HARQ response using the earliest transmission resource among the candidate transmission resources for the HARQ response. When the transmission resource for the HARQ response for the PDSCH of the slot #n shown in FIG. 10 is configured as the slot #n+3, the terminal may not transmit the HARQ response for the PDSCH of the slot #n in in the slot #n+3. In this case, the transmission resource of the HARQ response for the PDSCH of the slot #m is configured as the slot #m+3, and the transmission resource of the HARQ response for the PDSCH of the slot #m+2 is configured as the slot #m+4 (not shown), the terminal may transmit the HARQ response in the slot #m+3 that is earlier than the slot #m+4.

When the HARQ response is not transmitted in the transmission resource indicated by the DCI, the transmission of the HARQ response may be delayed. The delayed HARQ response may be referred to as a 'delayed HARQ response'. The terminal may transmit the delayed HARQ response when receiving a DCI triggering transmission of the delayed HARQ response from the base station. For example, the terminal may not transmit an HARQ response #1 in the transmission resource indicated by a DCI #1, and may then receive a new DCI #2 from the base station. In this case, the terminal may transmit an HARQ response #1 (e.g., delayed HARQ response) in a transmission resource indicated by the DCI #2. The DCI #2 may include a field for requesting to transmit the delayed HARQ response in the transmission resource indicated by the DCI #2. In addition, the DCI #2 may further include a field (e.g., DAI field) indicating the number of HARQ responses that can be transmitted in the transmission resource indicated by the DCI #2.

The maximum delay transmission time of the HARQ response may be configured. The delayed HARQ response may be transmitted within the maximum delay transmission time. When the maximum delay transmission time has elapsed, the terminal may not transmit the delayed HARQ response. The maximum delay transmission time may be predefined at the base station and the terminal. Alternatively, the base station may transmit an RRC message including information indicating the maximum delay transmission time of the HARQ response to the terminal. The terminal may determine whether to transmit the delayed HARQ response based on the maximum delay transmission time.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication system, the operation method comprising:
receiving downlink control information (DCI) #1 from a base station, the DCI #1 including scheduling information of a physical downlink shared channel (PDSCH) #1 and transmission resource information of a hybrid automatic repeat request (HARQ) response #1 for the PDSCH #1;
receiving the PDSCH #1 from the base station based on the scheduling information included in the DCI #1;
receiving DCI #2 from the base station, the DCI #2 including scheduling information of a PDSCH #2 and transmission resource information of an HARQ response #2 for the PDSCH #2;
receiving the PDSCH #2 from the base station based on the scheduling information included in the DCI #2; and
when the transmission resource information of the HARQ response #1 is configured as undefined, transmitting the HARQ response #1 and the HARQ response #2 to the base station by using a resource indicated by the transmission resource information of the HARQ response #2.

2. The operation method according to claim 1, wherein the DCI #1 further includes a PDSCH group index indicating a PDSCH group to which the PDSCH #1 belongs, the DCI #2 further includes a PDSCH group index indicating a PDSCH group to which the PDSCH #2 belongs, and when the transmission resource information of the HARQ response #1 is configured as undefined and the PDSCH #1 and the PDSCH #2 belong to a same PDSCH group, the HARQ response #1 and the HARQ response #2 are transmitted by using the resource indicated by the transmission resource information of the HARQ response #2.

3. The operation method according to claim 1, wherein the DCI #1 further includes a PDSCH group index indicating a PDSCH group to which the PDSCH #1 belongs, the DCI #2 further includes a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 and the HARQ response #2 are transmitted by using the resource indicated by the transmission resource information of the HARQ response #2.

4. The operation method according to claim 3, wherein the HARQ response #1 and the HARQ response #2 are transmitted in form of an HARQ codebook, and the HARQ codebook is configured according to an order of the PDSCH group indexes respectively associated with the HARQ response #1 and the HARQ response #2.

5. The operation method according to claim 1, wherein the DCI #1 further includes a PDSCH group index indicating a PDSCH group to which the PDSCH #1 belongs, the DCI #2 further includes a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 is not transmitted by using the resource indicated by the transmission resource information of the HARQ response #2, and the HARQ response #2 is transmitted by using the resource indicated by the transmission resource information of the HARQ response #2.

6. The operation method according to claim 1,
wherein the DCI #1 further includes a PDSCH group index indicating a PDSCH group #1 to which the PDSCH #1 belongs, and the DCI #2 further includes a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2,
wherein when the group indicator is set to a first value, the HARQ response #2 for the PDSCH #2 belonging to the PDSCH group #2 is transmitted in the resource indicated by the transmission resource information of the HARQ response #2, and wherein when the group indicator is set to a second value, the HARQ response #1 for the PDSCH #1 belonging to the PDSCH group #1 and the HARQ response #2 for the PDSCH #2 belonging to the PDSCH group #2 are transmitted by using the resource indicated by the transmission resource information of the HARQ response #2.

7. The operation method according to claim 1,
wherein the DCI #1 further includes a PDSCH group index indicating a PDSCH group #1 to which the PDSCH #1 belongs, and the DCI #2 further includes a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2, wherein when the group indicator is set to a first value, the HARQ response #2 for the PDSCH #2 belonging to the PDSCH group #2 is transmitted in the resource indicated by the transmission resource information of the HARQ response #2, and wherein when the group indicator is set to a second value, HARQ responses for PDSCHs belonging to all PDSCH groups are transmitted by using the resource indicated by the transmission resource information of the HARQ response #2.

8. The operation method according to claim 1, further comprising receiving a radio resource message (RRC) message including information indicating HARQ candidate transmission resources from the base station before receiving the DCI #1,
wherein the transmission resource information of each of the HARQ response #1 and the HARQ response #2 indicates one HARQ candidate transmission resource among the HARQ candidate transmission resources.

9. The operation method according to claim 8, wherein the RRC message further includes information indicating whether to perform a detection operation of one or more DCIs including the PDSCH group index.

10. The operation method according to claim 8, wherein the RRC message further includes information indicating a number of PDSCH groups.

11. The operation method according to claim 1, wherein the HARQ response #1 and the HARQ response #2 are transmitted through a physical uplink control channel (PUCCH) or a physical uplink shared channel (PUSCH) indicated by the transmission resource information of the HARQ response #2.

12. An operation method of a base station in a communication system, the operation method comprising:
transmitting downlink control information (DCI) #1 to a terminal, the DCI #1 including scheduling information of a physical downlink shared channel (PDSCH) #1 and transmission resource information of a hybrid automatic repeat request (HARQ) response #1 for the PDSCH #1;
transmitting the PDSCH #1 to the terminal based on the scheduling information included in the DCI #1;
transmitting DCI #2 to the terminal, the DCI #2 including scheduling information of a PDSCH #2 and transmission resource information of an HARQ response #2 for the PDSCH #2;
transmitting the PDSCH #2 to the terminal based on the scheduling information included in the DCI #2; and
when the transmission resource information of the HARQ response #1 is configured as undefined, receiving the HARQ response #1 and the HARQ response #2 from the terminal by using a resource indicated by the transmission resource information of the HARQ response #2.

13. The operation method according to claim 12, wherein the DCI #1 further includes a PDSCH group index indicating a PDSCH group to which the PDSCH #1 belongs, the DCI #2 further includes a PDSCH group index indicating a PDSCH group to which the PDSCH #2 belongs, and when the transmission resource information of the HARQ response #1 is configured as undefined and the PDSCH #1 and the PDSCH #2 belong to a same PDSCH group, the HARQ response #1 and the HARQ response #2 are received by using the resource indicated by the transmission resource information of the HARQ response #2.

14. The operation method according to claim 12, wherein the DCI #1 further includes a PDSCH group index indicating a PDSCH group to which the PDSCH #1 belongs, the DCI #2 further includes a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 and the HARQ response #2 are received by using the resource indicated by the transmission resource information of the HARQ response #2.

15. The operation method according to claim 14, wherein the HARQ response #1 and the HARQ response #2 are received in form of an HARQ codebook, and the HARQ codebook is configured according to an order of the PDSCH group indexes respectively associated with the HARQ response #1 and the HARQ response #2.

16. The operation method according to claim 12, wherein the DCI #1 further includes a PDSCH group index indicating a PDSCH group to which the PDSCH #1 belongs, the DCI #2 further includes a PDSCH group index indicating a PDSCH group to which the PDSCH #2 belongs, and when the transmission resource information of the HARQ response #1 is configured as undefined and the PDSCH #1 and the PDSCH #2 belong to different PDSCH groups, the HARQ response #1 is not received by using the resource indicated by the transmission resource information of the HARQ response #2, and the HARQ response #2 is received by using the resource indicated by the transmission resource information of the HARQ response #2.

17. The operation method according to claim 12,
wherein the DCI #1 further includes a PDSCH group index indicating a PDSCH group #1 to which the PDSCH #1 belongs, and the DCI #2 further includes a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2, wherein when the group indicator is set to a first value, the HARQ response #2 for the PDSCH #2 belonging to the PDSCH group #2 is received in the resource indicated by the transmission resource information of the HARQ response #2, and wherein when the group indicator is set to a second value, the HARQ response #1 for the PDSCH #1 belonging to the PDSCH group #1 and the HARQ response #2 for the PDSCH #2 belonging to the PDSCH group #2 are received by using the resource indicated by the transmission resource information of the HARQ response #2.

18. The operation method according to claim 12,
wherein the DCI #1 further includes a PDSCH group index indicating a PDSCH group #1 to which the PDSCH #1 belongs, and the DCI #2 further includes a PDSCH group index indicating a PDSCH group #2 to which the PDSCH #2 belongs and a group indicator indicating one or more PDSCH groups associated with one or more HARQ responses that can be transmitted in the resource indicated by the transmission resource information of the HARQ response #2,
wherein when the group indicator is set to a first value, the HARQ response #2 for the PDSCH #2 belonging to the PDSCH group #2 is received in the resource indicated by the transmission resource information of the HARQ response #2, and
wherein when the group indicator is set to a second value, HARQ responses for PDSCHs belonging to all PDSCH groups are received by using the resource indicated by the transmission resource information of the HARQ response #2.

19. The operation method according to claim 12, further comprising transmitting a radio resource message (RRC) message including information indicating HARQ candidate transmission resources to the terminal before transmitting the DCI #1,
wherein the transmission resource information of each of the HARQ response #1 and the HARQ response #2 indicates one HARQ candidate transmission resource among the HARQ candidate transmission resources.

20. The operation method according to claim 19, wherein the RRC message further includes information indicating whether to perform a detection operation of one or more DCIs including the PDSCH group index and information indicating a number of PDSCH groups.

* * * * *